(12) United States Patent
Kajiya

(10) Patent No.: US 11,693,156 B2
(45) Date of Patent: *Jul. 4, 2023

(54) OPTICAL BODY, FILM ADHESIVE BODY, AND METHOD FOR MANUFACTURING OPTICAL BODY

(71) Applicant: DEXERIALS CORPORATION, Tokyo (JP)

(72) Inventor: Shunichi Kajiya, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/320,044

(22) PCT Filed: Jun. 18, 2015

(86) PCT No.: PCT/JP2015/067668
§ 371 (c)(1),
(2) Date: Dec. 19, 2016

(87) PCT Pub. No.: WO2015/194649
PCT Pub. Date: Dec. 23, 2015

(65) Prior Publication Data
US 2017/0168198 A1 Jun. 15, 2017

(30) Foreign Application Priority Data
Jun. 19, 2014 (JP) ................. 2014-126749

(51) Int. Cl.
*G02B 1/10* (2015.01)
*G02B 5/02* (2006.01)
(Continued)

(52) U.S. Cl.
CPC .......... *G02B 1/118* (2013.01); *B29D 11/0073* (2013.01); *B29D 11/00288* (2013.01);
(Continued)

(58) Field of Classification Search
CPC ... G02B 1/00; G02B 1/04; G02B 1/10; G02B 1/105; G02B 1/11; G02B 1/111;
(Continued)

(56) References Cited

U.S. PATENT DOCUMENTS 5,276,600 A * 1/1994 Takase ............... F21V 7/16
359/838
2002/0044356 A1* 4/2002 Arakawa ............ G02B 1/11
359/566
(Continued)

FOREIGN PATENT DOCUMENTS

CN 102236462 A 11/2011
CN 103392135 A 11/2013
(Continued)

OTHER PUBLICATIONS

Oct. 16, 2017, Chinese Office Action Issued for related CN application No. 201580030233.9.
(Continued)

*Primary Examiner* — Thong Q Nguyen
(74) *Attorney, Agent, or Firm* — Paratus Law Group, PLLC

(57) ABSTRACT

There is provided a novel, improved optical body, the micro concave-convex structure of which can be protected without the use of a protective film, a film adhesive body, and a method for manufacturing an optical body, the optical body including: an optical film, on one surface of which is formed a first micro concave-convex structure in which an average cycle of concavities and convexities is less than or equal to a visible light wavelength; and a master film that covers the first micro concave-convex structure. The master film is provided with a second micro concave-convex structure formed on a surface that faces the first micro concave-convex structure, the second micro concave-convex structure is made of a cured curing resin, and has a reverse shape (Continued)

of the first micro concave-convex structure, and the optical film and the master film are separable from each other.

22 Claims, 18 Drawing Sheets

(51) Int. Cl.
*G02B 1/118* (2015.01)
*B32B 9/00* (2006.01)
*B32B 3/30* (2006.01)
*B29D 11/00* (2006.01)

(52) U.S. Cl.
CPC .. *B29D 11/00365* (2013.01); *B29D 11/00442* (2013.01); *B29D 11/00788* (2013.01); *B32B 3/30* (2013.01); *B32B 9/00* (2013.01); *G02B 5/0231* (2013.01)

(58) Field of Classification Search
CPC .......... G02B 1/113; G02B 1/115; G02B 5/00; G02B 5/02; G02B 5/0205; G02B 5/021; G02B 5/0215; G02B 5/0221; G02B 5/0231; G02B 5/0268; G02B 5/0273; G02B 5/0278; B32B 9/00; B32B 3/30; B29D 11/00288; B29D 11/0073; B29D 11/00365; B29D 11/00442; B29D 11/00788
USPC .................................. 359/599–601, 577–590
See application file for complete search history.

(56) References Cited

U.S. PATENT DOCUMENTS

| | | | | |
|---|---|---|---|---|
| 2003/0054187 A1* | 3/2003 | Higashi | ............. | B29C 45/14811 428/520 |
| 2005/0057789 A1* | 3/2005 | Funada | ................. | B29C 59/022 359/31 |
| 2009/0246494 A1* | 10/2009 | Matsumoto | ........ | C08G 65/3322 526/318.4 |
| 2011/0128629 A1* | 6/2011 | Takahashi | .......... | G02B 27/0006 359/601 |
| 2011/0159245 A1* | 6/2011 | Taniguchi | ................ | H05K 3/20 428/156 |
| 2012/0132897 A1* | 5/2012 | Seki | ..................... | G02B 5/1809 257/40 |
| 2012/0160560 A1* | 6/2012 | Kajiya | ..................... | G02B 1/11 174/70 R |
| 2012/0212825 A1* | 8/2012 | Nomura | .................. | G02B 1/118 359/580 |
| 2012/0240999 A1* | 9/2012 | Yoshida | ................. | B82Y 10/00 136/256 |
| 2013/0342794 A1 | 12/2013 | Okada et al. | | |
| 2015/0028325 A1* | 1/2015 | Seki | ....................... | G03F 7/0002 257/40 |
| 2015/0158268 A1* | 6/2015 | Koike | ................... | G03F 7/0002 156/247 |
| 2015/0165733 A1 | 6/2015 | Takihara et al. | | |

FOREIGN PATENT DOCUMENTS

| | | |
|---|---|---|
| JP | H10-206703 A | 8/1998 |
| JP | 2003-090902 | 3/2003 |
| JP | 2003-098304 | 4/2003 |
| JP | 2004-205990 | 7/2004 |
| JP | 2008-269720 | 11/2008 |
| JP | 2009-109755 | 5/2009 |
| JP | 2011-053496 | 3/2011 |
| JP | 2011-083356 | 4/2011 |
| JP | 2011-221470 A | 11/2011 |
| JP | 2012-058397 | 3/2012 |
| JP | 2013-142741 A | 7/2013 |
| JP | 2013-195579 | 9/2013 |
| WO | WO 2008/126515 A1 | 10/2008 |
| WO | WO2012/115059 | 8/2012 |
| WO | WO 2012/157717 A1 | 11/2012 |
| WO | WO 2013/191169 A1 | 12/2013 |
| WO | WO 2014/065136 A1 | 5/2014 |

OTHER PUBLICATIONS

Jul. 1, 2019, Chinese Office Action issued for related CN Application No. 201580030233.9.
May 7, 2019, Japanese Office Action issued for related JP Application No. 2014-126749.
Jan. 14, 2019, Chinese Office Action issued for related CN Application No. 201580030233.9.
Sep. 4, 2018, Japanese Office Action issued for related JP application No. 2014-126749.
Sep. 25, 2021, Korean Office Action issued for related KR application No. 10-2016-7034029.
Jul. 15, 2022, Korean Office Action issued for related KR Application No. 10-2016-7034029.

* cited by examiner cross-section along x-x

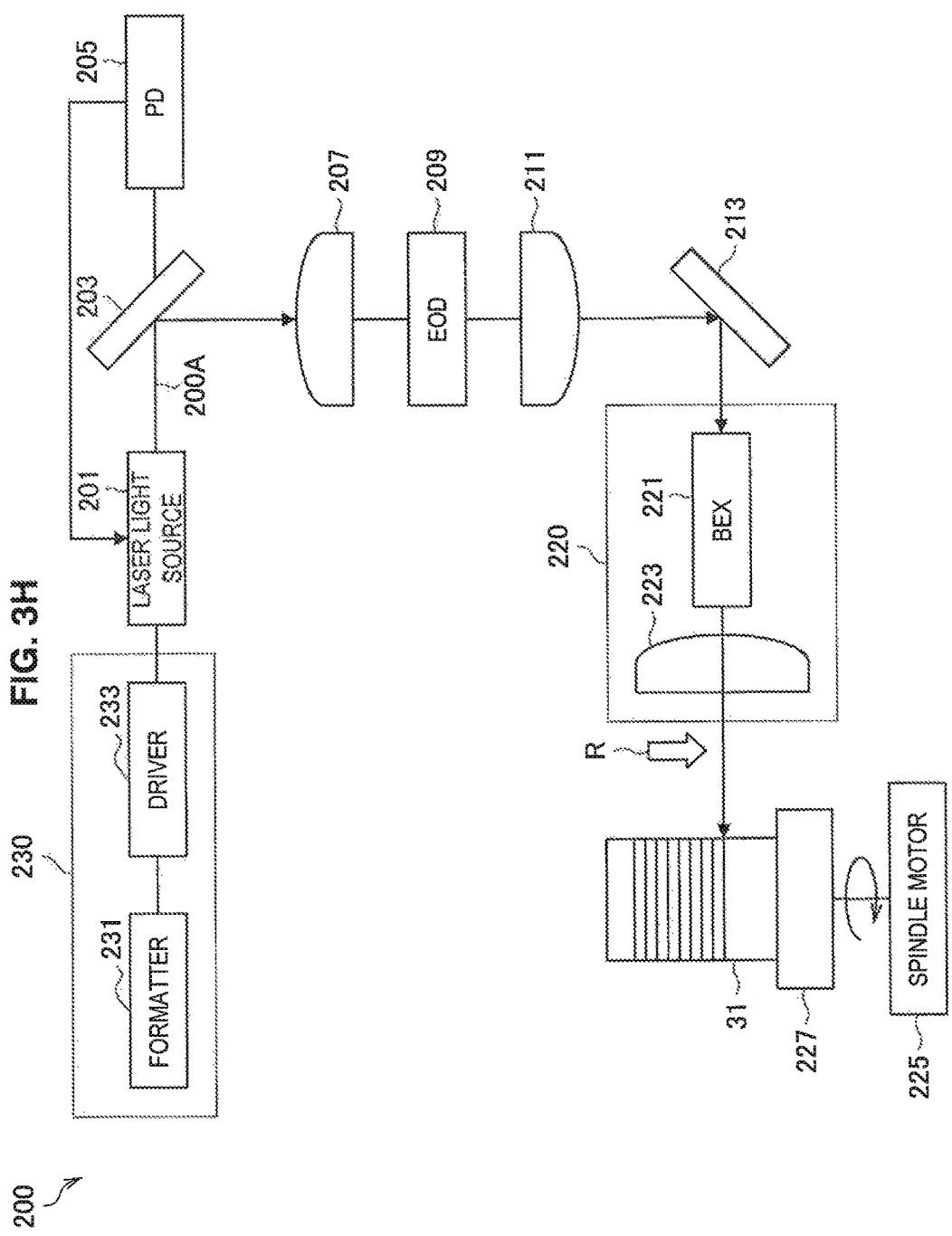

FIG. 4A
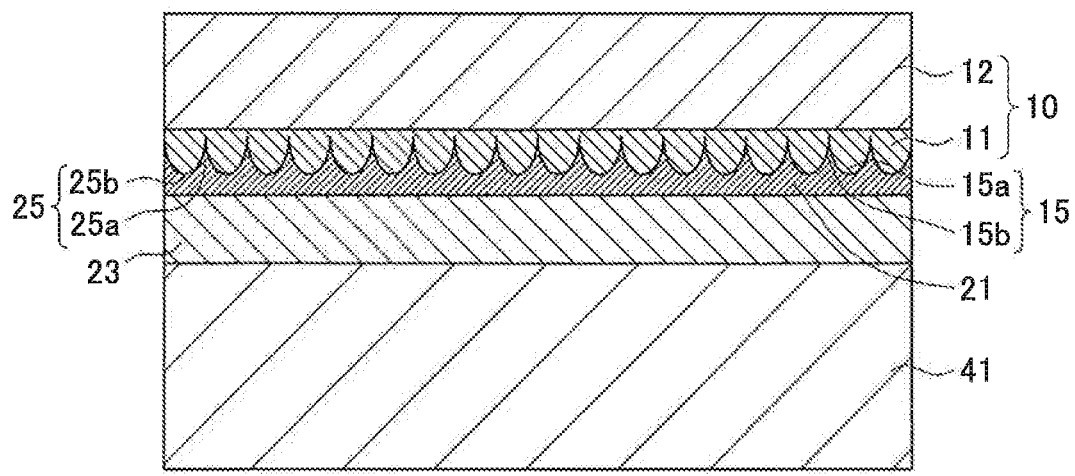
FIG. 4B
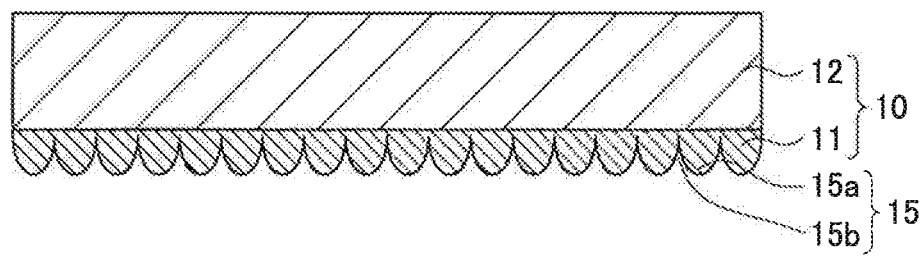
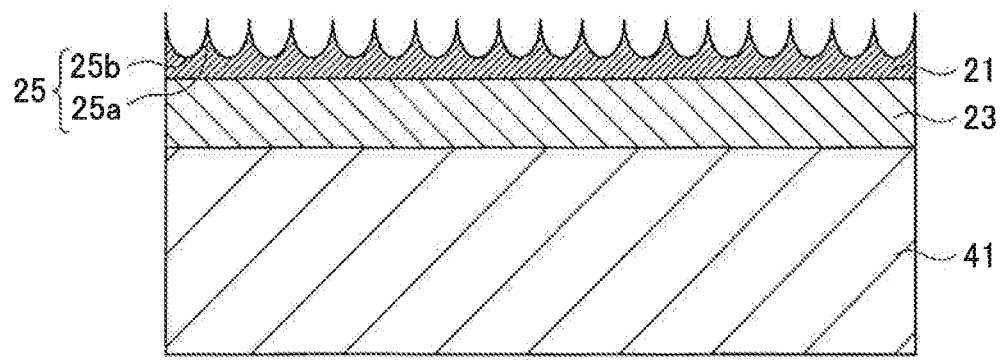

FIG. 5A
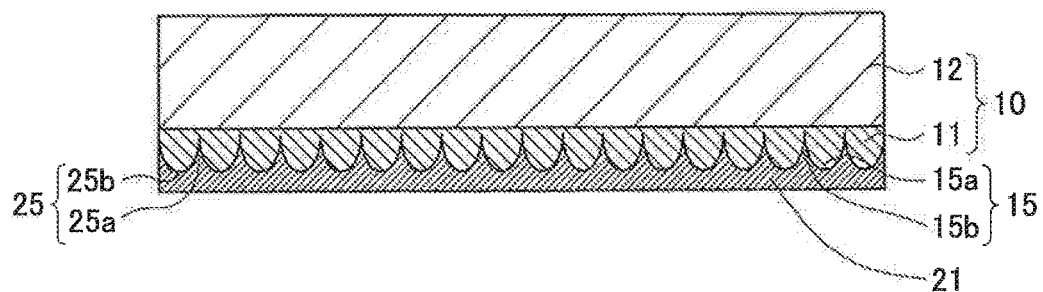
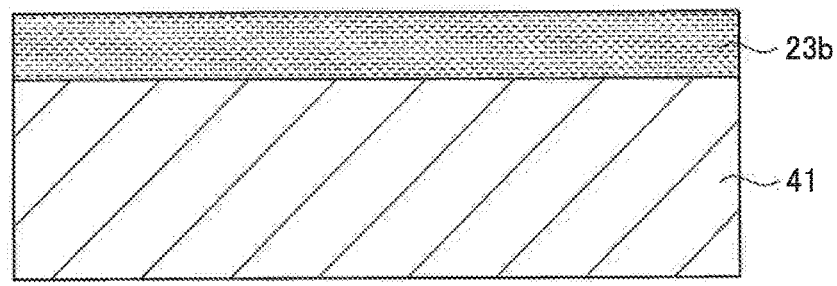
FIG. 5B
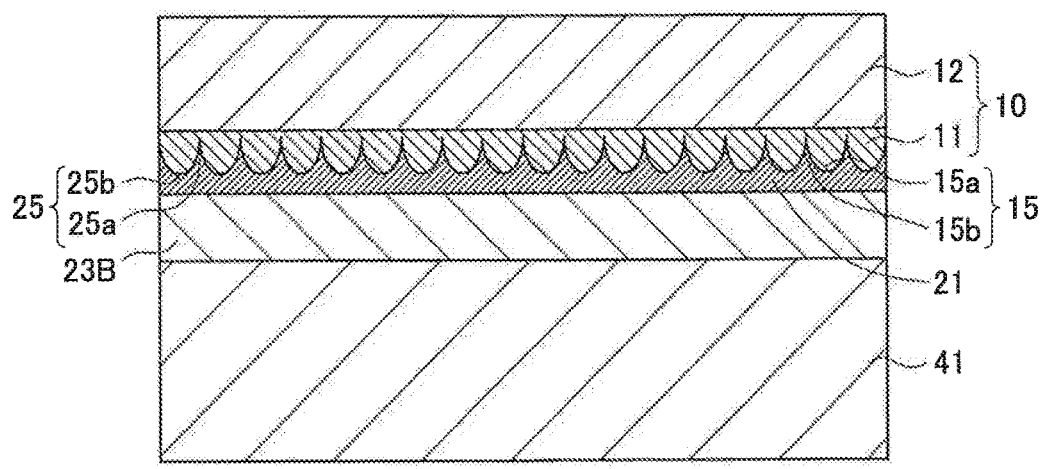

FIG. 5C
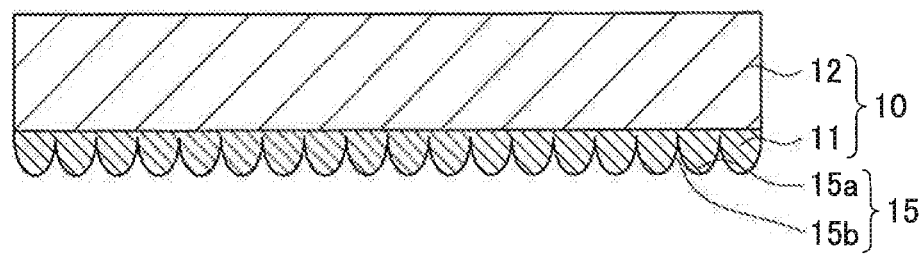
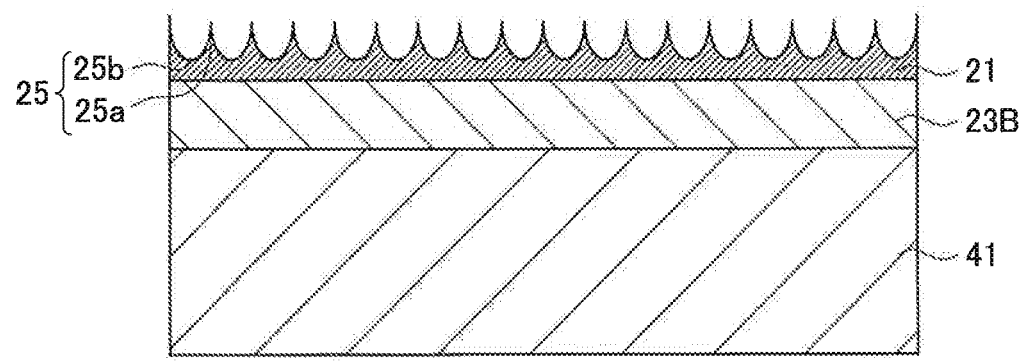

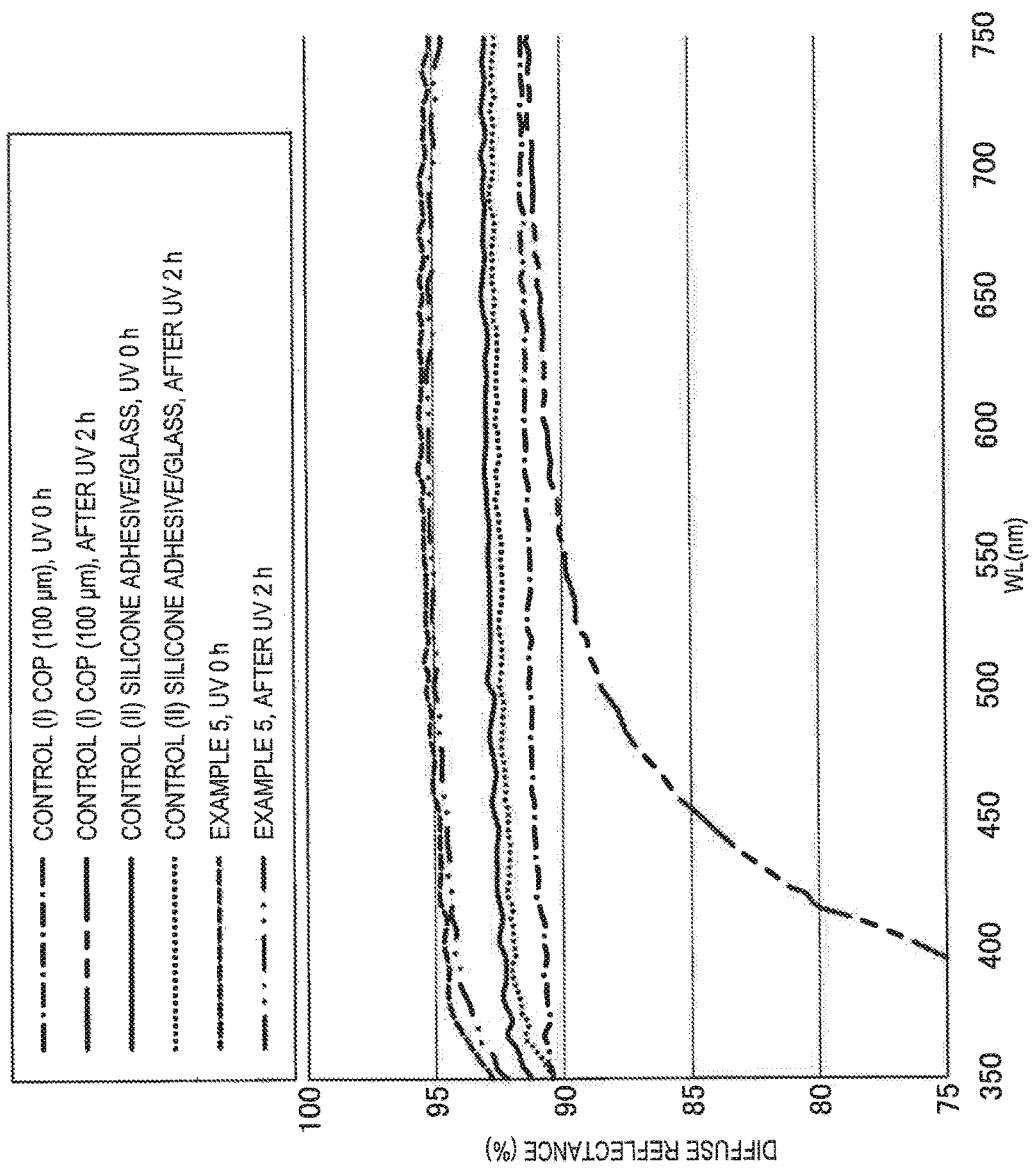

OPTICAL BODY, FILM ADHESIVE BODY, AND METHOD FOR MANUFACTURING OPTICAL BODY

CROSS REFERENCE TO PRIOR APPLICATION

This application is a National Stage Patent Application of PCT International Patent Application No. PCT/JP2015/067668 (filed on Jun. 18, 2015) under 35 U.S.C. § 371, which claims priority to Japanese Patent Application No. 2014-126749 (filed on Jun. 19, 2014), which are all hereby incorporated by reference in their entirety.

Technical Field

The present invention relates to an optical body, a film adhesive body, and a method for manufacturing an optical body.

Background Art

An optical film on which is formed a micro concave-convex structure in which the average cycle of the concavities and convexities is less than or equal to the visible light wavelengths has excellent anti-reflective effects for light in the visible light wavelength region. Consequently, an optical film having a micro concave-convex structure is used as an anti-reflective film, for example. Such a micro concave-convex structure is also called a moth-eye structure. Optical films on which a micro concave-convex structure is formed are disclosed in Patent Literature 1 to 3, for example.

As a method of forming a micro concave-convex structure, there is the UV nanoimprint method disclosed in Patent Literature 1, for example. With the UV nanoimprint method, there is produced a master on the surface of which is formed a micro concave-convex structure. Subsequently, by coating a base material with an uncured light-curing resin, an uncured resin layer is formed on the base material. Subsequently, the uncured resin layer is transferred onto the micro concave-convex structure of the master, and the uncured resin layer is cured. Consequently, a micro concave-convex structure is formed on the base material (with this micro concave-convex structure having the reverse shape of the micro concave-convex structure of the master).

Meanwhile, as disclosed in Patent Literature 2, for example, a protective film is applied to the micro concave-convex structure of an anti-reflective film in some cases, to protect the micro concave-convex structure during storage, transport, usage, or the like of the anti-reflective film. The protective film is applied to the micro concave-convex structure with an adhesive. For this reason, when the protective film is peeled away from the micro concave-convex structure, in some cases residual adhesive may remain on the micro concave-convex structure. If residual adhesive remains on the micro concave-convex structure, in some cases the properties of the anti-reflective film may be degraded by the adhesive. A conceivable method of addressing this issue is to lower the adhesion of the adhesive, but with this method, the protective film disengages more readily from the micro concave-convex structure. In other words, there is a possibility that the micro concave-convex structure may be insufficiently protected by the protective film. Accordingly, Patent Literature 2 proposes the use of a protective film using a specific adhesive.

Citation List

Patent Literature

Patent Literature 1: JP 2011-053496A
Patent Literature 2: JP 2011-088356A
Patent Literature 3: JP 2009-109755A

Technical Problem

Meanwhile, there is a problem in that the cost of the protective film disclosed in Patent Literature 2 is extremely high. On the other hand, if a low-cost protective film is used, there is a possibility that residual adhesive may remain on the micro concave-convex structure when the protective film is peeled away, or the micro concave-convex structure may be insufficiently protected by the protective film. For this reason, a technology capable of protecting the micro concave-convex structure without the use of a protective film is desirable.

In addition, to ensure the handling properties of the anti-reflective film, some degree of thickness in the anti-reflective film has been necessary. However, if the anti-reflective film is too thick, there is a problem in that the adhesive body of the anti-reflective film becomes thick. Furthermore, if the anti-reflective film is applied to an adherend with large concavities and convexities on the surface thereof, there is a problem in that the anti-reflective film cannot sufficiently conform to the concavities and convexities on the surface of the adherend.

For example, as illustrated in FIG. 10, when using an adhesive layer 53 with a thickness of 25 μm to apply an anti-reflective film 52 with a thickness of 50 μm to a touch panel 50 having a frame body 51 with a height s of 50 μm, in some cases the anti-reflective film 52 is unable to conform to the height s of the frame body 51. In this case, after the adhesion of the anti-reflective film 52, an air gap 54 is formed at the perimeter of the frame body 51, thereby degrading the appearance of the touch panel 50.

Another conceivable method of addressing the above issue is to form a micro concave-convex structure directly on the surface of the adherend. However, there is a problem in that the micro concave-convex structure formed by this method is of inconsistent quality when the surface of the adherend is curved. Furthermore, forming the micro concave-convex structure directly on the surface of the adherend may interfere with subsequent processing steps in some cases. Consequently, the above issue cannot be solved fundamentally with this method.

Also, another conceivable method of addressing the above issue is to make the protective film thicker. According to this method, the anti-reflective film is transported or the like as an optical body integrated with the protective film, thereby improving the handling properties of the optical body, and by extension, also improving the handling properties of the anti-reflective film. However, since this method requires a protective film, the demand to protect the micro concave-convex structure without the use of a protective film cannot be met.

SUMMARY OF INVENTION

Accordingly, the present invention has been devised in light of the above issue, and an objective of the present invention is to provide a novel, improved optical body, the micro concave-convex structure of which can be protected without the use of a protective film, with which the optical film can be made thinner, and with which it is possible to improve the handling properties; a film adhesive body; and a method for manufacturing an optical body.

Solution to Problem

According to an aspect of the present invention in order to solve the above-mentioned problem, there is provided an optical body, including: an optical film, on one surface of which is formed a first micro concave-convex structure in which an average cycle of concavities and convexities is less than or equal to a visible light wavelength; and a master film that covers the first micro concave-convex structure. The master film is provided with a second micro concave-convex structure formed on a surface that faces the first micro concave-convex structure, the second micro concave-convex structure is made of a cured curing resin, and has a reverse shape of the first micro concave-convex structure, and the optical film and the master film are separable from each other.

A thickness of the optical film may be from 1 μm to 10 μm.

The optical body may further include an adhesive layer formed on another surface of the optical film.

A thickness of the adhesive layer may be from 2 μm to 50 μm.

The master film may include an inorganic film that covers the second micro concave-convex structure.

A spectral reflectance (for wavelengths from 350 nm to 800 nm) of the first micro concave-convex structure and the second micro concave-convex structure may be from 0.1% to 1.8%.

A release agent may be added to at least one of the optical film and the master film.

The optical film and the master film may have a mutually different elastic modulus.

According to another aspect of the present invention, there is provided a film adhesive body, including an adherend, and an optical film applied to the adherend. The optical film is applied to the adherend by applying an optical body to the adherend, and then peeling away the master film from the optical body.

The adherend may be any one type selected from the group consisting of an optical component, a display element, and an input element.

According to another aspect of the present invention, there is provided a method for manufacturing an optical body, including: preparing a master, on a surface of which is formed a third micro concave-convex structure in which an average cycle of concavities and convexities is less than or equal to a visible light wavelength; transferring the third micro concave-convex structure to an uncured resin layer for a master film, and thus forming, on a surface of the uncured resin layer for a master film, a second micro concave-convex structure having a reverse shape of the third micro concave-convex structure; producing a master film by curing the uncured resin layer for a master film; transferring the second micro concave-convex structure formed on a surface of the master film to an uncured resin layer for an optical film, and thus forming, on a surface of the uncured resin layer for an optical film, a first micro concave-convex structure having a reverse shape of the second micro concave-convex structure; and producing an optical film by curing the uncured resin layer for an optical film.

A thickness of the optical film may be from 1 μm to 10 μm.

The method for manufacturing an optical body may further include: forming an adhesive layer on a surface on an opposite side of the surface on which is formed the first micro concave-convex structure from among surfaces of the optical film.

A thickness of the adhesive layer may be from 2 μm to 50 μm.

After producing the master film, an inorganic film that covers the second micro concave-convex structure may be formed, and the second micro concave-convex structure on which is formed the inorganic film may be transferred to the uncured resin layer for an optical film.

A release agent may be added to at least one of the uncured resin layer for a master film and the uncured resin layer for an optical film.

The optical film and the master film may have a mutually different elastic modulus.

According to the above aspect, the optical film is protected by the master film, and thus a protective film becomes unnecessary. Furthermore, the master film is made up of a cured curing resin. For this reason, when the master film is peeled away from the optical film, residual debris or the like from the master film is unlikely to remain on the micro concave-convex structure of the optical film. Furthermore, since the optical body is able to gain thickness due to the master film, the handling properties of the optical body 1 may be improved while also making the optical film thinner.

Advantageous Effects of Invention

According to the present invention as described above, the micro concave-convex structure can be protected without the use of a protective film, the optical film can be made thinner, and in addition, the handling properties can be improved.

BRIEF DESCRIPTION OF DRAWINGS

FIG. 3H is a block diagram illustrating an example configuration of a photolithography device.

FIG. 3I is a schematic depiction illustrating an example of a transfer device that manufactures a master film roll-to-roll.

FIG. 4A is a cross-sectional view illustrating an example of an optical body usage method.

FIG. 4B is another cross-sectional view illustrating an example of an optical body usage method.

FIG. 5A is a cross-sectional view illustrating another example of an optical body usage method.

FIG. 5B is another cross-sectional view illustrating another example of an optical body usage method.

FIG. 5C is another cross-sectional view illustrating another example of an optical body usage method.

FIG. 8 is spectral transmittance curves indicating results of a light resistance test.

Description Of Embodiments

Figure 1:
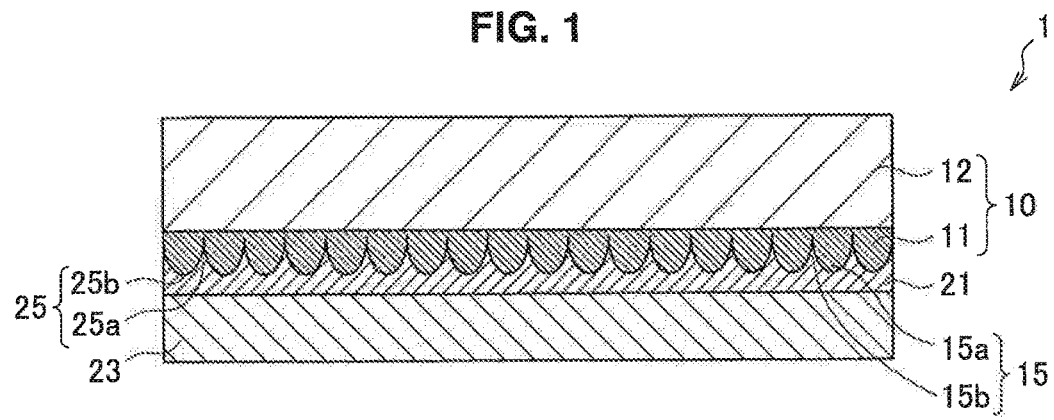
FIG. 1 is a cross-sectional view illustrating an example of an optical body according to the present embodiment.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

<1. Overall Configuration of Optical Body>

First, an overall configuration of an optical body 1 according to the present embodiment will be described based on FIG. 1. The optical body 1 is provided with a master film 10, an optical film 21, and an adhesive layer 23. Note that the adhesive layer 23 may also be absent.

The master film 10 is a film that protects the optical film 21. Also, by making the master film 10 thick, it is possible to improve the handling properties of the optical body 1 while also making the optical film 21 thinner. The master film 10 is provided with a micro concave-convex structure 15 (second micro concave-convex structure) formed on the surface thereof that faces the optical film 21. Meanwhile, the optical film 21 is provided with a micro concave-convex structure 25 (first micro concave-convex structure) formed on the surface thereof that faces the master film 10. The micro concave-convex structure 25 has the reverse shape of the micro concave-convex structure 15, and engages with the micro concave-convex structure 15. In other words, the convexities 25a of the micro concave-convex structure 25 enter the concavities 15b of the micro concave-convex structure 15, while the convexities 15a of the micro concave-convex structure 15 enter the concavities 25b of the micro concave-convex structure 25. Additionally, the average cycle of these micro concave-convex structures 15 and 25 is less than or equal to the visible light wavelengths.

Consequently, not only the optical film 21 but also the master film 10 becomes usable as an anti-reflective film. Also, the master film 10 and the optical film 21 are separable from each other.

<2. Configuration of Master Film>

Next, the configuration of the master film 10 will be described based on FIGS. 1 to 2B. The master film 10 is provided with a base material film 12, and a micro convex-concave resin layer 11 formed on one surface of the base material film 12. Note that the base material film 12 and the micro convex-concave resin layer 11 may also be made into a solid cast. For example, by making the base material film 12 be a thermoplastic resin film, the base material film 12 and the micro convex-concave resin layer 11 may be made into a solid cast. Details will be discussed later.

The micro concave-convex structure 15 is formed on the surface of the micro convex-concave resin layer 11 (that is, the surface of the master film 10). The micro concave-convex structure 15 includes multiple convexities 15a, which are convex in the film-thickness direction of the master film 10, and multiple concavities 15b, which are concave in the film-thickness direction of the master film 10. The convexities 15a and the concavities 15b are arranged periodically on the master film 10. For example, in the example of FIG. 2A, the convexities 15a and the concavities 15b are arranged in a staggered lattice. Obviously, the convexities 15a and the concavities 15b may also be arranged in a different arrangement pattern. For example, the convexities 15a and the concavities 15b may also be arranged in a square lattice. Additionally, the convexities 15a and the concavities 15b may also be arranged randomly. The shapes of the convexities 15a and the concavities 15b are not particularly limited. The shapes of the convexities 15a and the concavities 15b may also be bullet-shaped, conical, columnar, or needle-shaped. Note that the shape of the concavities 15b means the shape formed by the inner wall faces of the concavities 15b.

The average cycle of the concavities and convexities of the micro concave-convex structure 15 is less than or equal to the visible light wavelengths (for example, less than or equal to 830 nm), preferably more than or equal to 100 nm and less than or equal to 350 nm, and more preferably more than or equal to 150 nm and less than or equal to 280 nm. Consequently, the micro concave-convex structure 15 has what is called a moth-eye structure. Herein, if the average cycle is less than 100 nm, there is a possibility that the formation of the micro concave-convex structure 15 may become difficult, which is not preferable. Also, if the average cycle exceeds 350 nm, there is a possibility that a diffraction phenomenon of visible light may occur, which is not preferable.

Figure 2A:
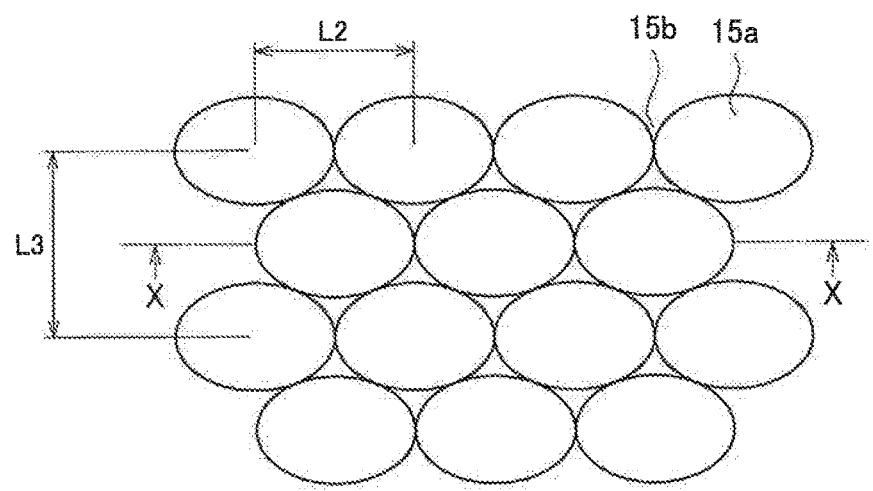
FIG. 2A is a plan view illustrating an example of a micro concave-convex structure formed on a surface of a master film.

The average cycle of the micro concave-convex structure 15 is the arithmetic mean value of the distance between adjacent convexities 15a and between adjacent concavities 15b. Note that the micro concave-convex structure 15 is observable with a device such as a scanning electronic microscope (SEM) or a cross-section tunneling electronic microscope (cross-section TEM), for example. Also, a method of calculating the average cycle is as follows, for example. Namely, multiple pairs of adjacent concavities 15b and pairs of adjacent convexities 15a are picked up, and the distance therebetween (pitch) is measured. Subsequently, the average cycle may be calculated by taking the arithmetic mean of the measured values. Note that when the convexities 15a and the concavities 15b are arranged periodically on the master film 10, the pitch between the convexities 15a (or the concavities 15b) is categorized as the dot pitch L2 and the track pitch L3, for example. In other words, when the convexities 15a and the concavities 15b are arranged periodically on the master film 10, the micro concave-convex structure 15 may be considered to be an arrangement of parallel tracks (rows) made up of multiple convexities 15a and concavities 15b. In the example of FIG. 2A, the tracks extend in the horizontal direction, and are lined up in the vertical direction. Also, the convexities 15a (or the concavities 15b) arranged between adjacent tracks are offset from each other in the track length direction by half the length of the convexities 15a (or the concavities 15b). The dot pitch L2 is the pitch between the convexities 15a (or the concavities 15b) arranged in the track length direction. The track pitch L3 is the pitch between the convexities 15a (or the concavities 15b) arranged in the track arrangement direction (the vertical direction in FIG. 2A).

Figure 2B:
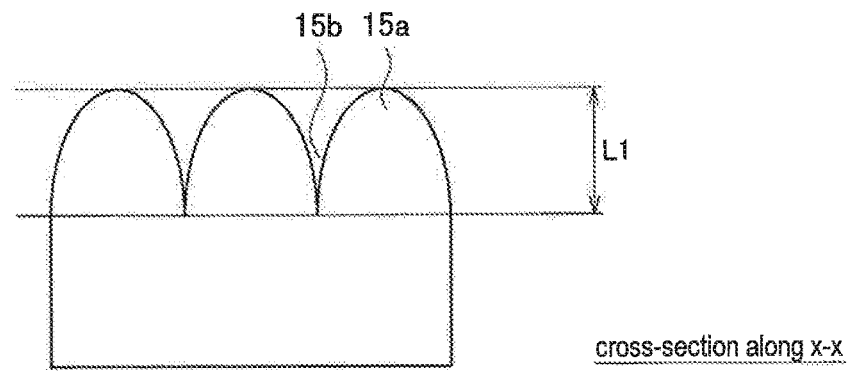
FIG. 2B is an XX cross-sectional view illustrating an example of a micro concave-convex structure formed on a surface of a master film.

Also, the height of the convexities 15a (depth of the concavities 15b) L1 illustrated in FIG. 2B is not particularly limited, being preferably more than or equal to 150 nm and less than or equal to 300 nm, more preferably more than or equal to 190 nm and less than or equal to 300 nm, and still more preferably more than or equal to 190 nm and less than or equal to 230 nm.

By having the average cycle and the height of the micro concave-convex structure 15 take values in the above ranges, the anti-reflective properties of the master film 10 may be improved further. Specifically, the spectral reflectance of the micro concave-convex structure 15 (spectral specular reflectance for wavelengths from 350 nm to 800 nm) may be set from 0.1% to 1.8%. Also, in the case of forming the micro concave-convex structure 15 by a transfer method as discussed later, the master film 10 may be released easily from the master 30 after the transfer. Note that the height of the convexities 15a may also differ among the individual convexities 15a.

The micro convex-concave resin layer 11 is made up of a cured curing resin. The cured curing resin is preferably transparent. The curing resin includes a polymerizable compound and a curing initiator. The polymerizable compound is a resin that is cured by the curing initiator. The polymerizable compound may be a compound such as a polymerizable epoxy compound or a polymerizable acrylic compound, for example. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber and urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, N-vinyl pyrrolidone, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl)ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane acrylate.

Examples of "multifunctional monomers" include trimethylolpropane tri-acrylate, dipentaerythritol penta- and hexa-acrylate, and ditrimethylolpropane tetra-acylate.

Examples other than the polymerizable acrylic compounds listed above include acrylmorpholine, glycerol acrylate, polyether acrylates, N-vinylformamide, N-vinylcaprolactone, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers. From the perspective of transparency and separability from the optical film 21 of the master film 10, the polymerizable compound preferably is a polymerizable acrylic compound.

The curing initiator is a material that cures the curing resin. Examples of the curing initiator include thermal curing initiators and photo-curing initiators, for example. The curing initiator may also be one that cures by some kind of energy beam other than heat or light (for example, an electron beam) or the like. In the case in which the curing initiator is a thermal curing initiator, the curing resin is a thermosetting resin, whereas in the case in which the curing initiator is a photo-curing initiator, the curing resin is a photosetting resin.

Herein, from the perspective of transparency and separability from the optical film 21 of the master film 10, the curing initiator preferably is an ultraviolet-curing initiator. Consequently, the curing resin preferably is an ultraviolet-curing acrylic resin. An ultraviolet-curing initiator is a type of photo-curing initiator. Examples of ultraviolet-curing initiators include 2,2-dimethoxy-1,2-diphenylethane-1-one, 1-hydroxy-cyclohexyl phenyl ketone, and 2-hydroxy-2-methyl-1-phenyl propane-1-one.

Additionally, additives may also be added to the micro convex-concave resin layer 11 depending on the purpose of the optical body 1. Examples of additives include inorganic fillers, organic fillers, leveling agents, surface conditioners, and antifoaming agents. Note that examples of types of inorganic fillers include metallic oxide particles such as $SiO_2$, $TiO_2$, $ZrO_2$, $SnO_2$, and $Al_2O_3$. Furthermore, a release agent or the like may also be added to the micro convex-concave resin layer 11 to enable easy separation of the master film 10 and the optical film 21. Details will be discussed later.

The thickness of the micro convex-concave resin layer 11 is preferably from 1 μm to 60 μm from the perspective of manufacturing consistency of the micro concave-convex structure 15.

The type of the base material film 12 is not particularly limited, but in the case of using the master film 10 as an anti-reflective film, a transparent and tear-resistant film is preferable. Examples of the base material film 12 include polyethylene terephthalate (PET) film and triacetyl cellulose (TAC) film.

In the present embodiment, the master film 10 is able to protect the micro concave-convex structure 25 of the optical film 21. Furthermore, by making the master film 10 thick, it is possible to improve the handling properties of the optical body 1. In other words, in the present embodiment, since the handling properties of the optical body 1 may be ensured by the master film 10, the optical film 21 may be made thinner. Making the master film 10 thicker is achieved by making the base material film 12 thicker, for example. It is sufficient to adjust the thickness of the base material film 12 as appropriate according to the purpose of the optical body 1, or in other words the handling properties demanded of the optical body 1. The thickness of the base material film 12 may be from 50 μm to 125 μm, for example.

<3. Configuration of Optical Film>

Next, the configuration of the optical film 21 will be described based on FIG. 1. The optical film 21 includes the micro concave-convex structure 25 formed on the surface thereof on one side (the surface on the side that faces the master film 10).

The micro concave-convex structure 25 includes multiple convexities 25a, which are convex in the film-thickness direction of the optical film 21, and multiple concavities 25b, which are concave in the film-thickness direction of the optical film 21. The micro concave-convex structure 25 has the reverse shape of the micro concave-convex structure 15. Consequently, the average cycle of the micro concave-convex structure 25 approximately matches the average cycle of the micro concave-convex structure 15. In other words, in the micro concave-convex structure 25, the average cycle of the concavities and convexities likewise is less than or equal to the visible light wavelengths.

Specifically, the average cycle of the concavities and convexities of the micro concave-convex structure 25 is less than or equal to the visible light wavelengths (for example, less than or equal to 830 nm), preferably more than or equal to 100 nm and less than or equal to 350 nm, and more preferably more than or equal to 150 nm and less than or equal to 280 nm. Consequently, the micro concave-convex structure 25 has what is called a moth-eye structure. Also, the height of the convexities 25a is not particularly limited, being preferably more than or equal to 150 nm and less than or equal to 300 nm, more preferably more than or equal to 190 nm and less than or equal to 300 nm, and still more preferably more than or equal to 190 nm and less than or equal to 230 nm.

By having the average cycle and the height of the micro concave-convex structure 25 take values in the above ranges, the anti-reflective properties of the optical film 21 may be improved further. Specifically, the spectral reflectance (for wavelengths from 350 nm to 800 nm) of the micro concave-convex structure 25 may be set from 0.1% to 1.8%.

The thickness of the optical film 21 is not particularly limited. However, in the present embodiment, the optical body 1 is able to gain thickness due to the master film 10. Consequently, the optical film 21 may be made thinner while also ensuring the handling properties of the optical body 1. For example, the thickness of the optical film 21 may be from 1 μm to 10 μm, and more preferably from 1 μm to 6 μm. In the present embodiment, since the optical film 21 may be made thinner, when preparing the optical film 21, the micro concave-convex structure 25 may also not be formed on the base material film. Also, it is sufficient for the optical film 21 to be made of a curing resin or the like similar to the micro convex-concave resin layer 11.

<3-1. Configuration for Enabling Separability of Master Film and Optical Film>

The master film 10 is separable from the optical film 21. In more detail, the micro convex-concave resin layer 11 of the master film 10 and the optical film 21 are separable from each other.

The method by which the micro convex-concave resin layer 11 of the master film 10 and the optical film 21 are separable is not particularly limited, and may be the following methods, for example. The following methods may be conducted alone, or multiple methods may be used jointly. For example, a release agent may be added to at least one of the micro convex-concave resin layer 11 and the optical film 21. Herein, the type of release agent is not particularly limited, and may be a silicone-type or fluorine-type release agent or the like.

Additionally, the elastic modulus (Young's modulus) of the micro convex-concave resin layer 11 may be set to a different value than the elastic modulus of the optical film 21. Note that the difference between the elastic modulus of the micro convex-concave resin layer 11 and the elastic modulus of the optical film 21 is preferably from 400 MPa to 1200 MPa. For example, the elastic modulus of the optical film 21 may be set from 300 MPa to 700 MPa, while the elastic modulus of the micro convex-concave resin layer 11 may be set from 700 MPa to 1500 MPa. At this point, the method of adjusting the elastic modulus of the micro convex-concave resin layer 11 and the optical film 21 may be, for example, mixing into the uncured curing resin a modified diacrylate with few functional groups, or a glycol resin or the like having a low modulus after curing. Herein, the glycol resin having a low modulus after curing may be polyethylene glycol diacrylate or the like, for example.

In addition, an inorganic film (for example, an inorganic film 16 illustrated in FIG. 3J) may be formed on the surface of the micro concave-convex structure 15. Herein, the material constituting the inorganic film may be silicon oxide, silicon, tungsten oxide, ITO, or the like. The thickness of the inorganic film is not particularly limited, and may be approximately from several nanometers to 20 nm, for example. The inorganic film is formed on the surface of the micro concave-convex structure 15 by sputtering or the like, for example. If an inorganic film is formed on the surface of the micro concave-convex structure 15, the processes discussed above may also be omitted.

<4. Configuration of Adhesive Layer>

The adhesive layer 23 is formed on the surface of the other side of the optical film 21 (the surface on the side where the micro concave-convex structure 25 is not formed). The material constituting the adhesive layer 23 is not particularly limited, and may be selected appropriately according to factors such as the purpose of the optical body 1. For example, the adhesive layer 23 is made up of a curing adhesive agent such as a photosetting adhesive agent or a thermosetting adhesive agent, or a pressure-sensitive adhesive agent (adhesive agent). More specifically, the adhesive layer 23 is preferably formed from an optically clear adhesive agent with high total light transmittance and low haze. For example, the adhesive layer 23 is preferably made up of optically clear adhesive (OCA) tape such as a non-carrier acrylic adhesive film or the like. Additionally, the adhesive layer 23 may also be made up of a light-resistant and heat-resistant curing adhesive agent. In this case, the light resistance and heat resistance of the optical body 1 may be improved. The thickness of the adhesive layer 23 is not particularly limited, but is preferably from 2 μm to 50 μm, from the perspective of the handling properties of the optical body 1 during application work, and the conformability of the optical body 1 to the surface shape of the adherend (the object to which the optical body 1 is applied).

In the present embodiment, the thickness of the optical film 21 may be set from 1 μm to 10 μm, and the thickness of the adhesive layer 23 may be set from 2 μm to 50 μm. Consequently, the total thickness of the optical film 21 and the adhesive layer 23 may be set from 3 μm to 60 μm.

Figure 9A:
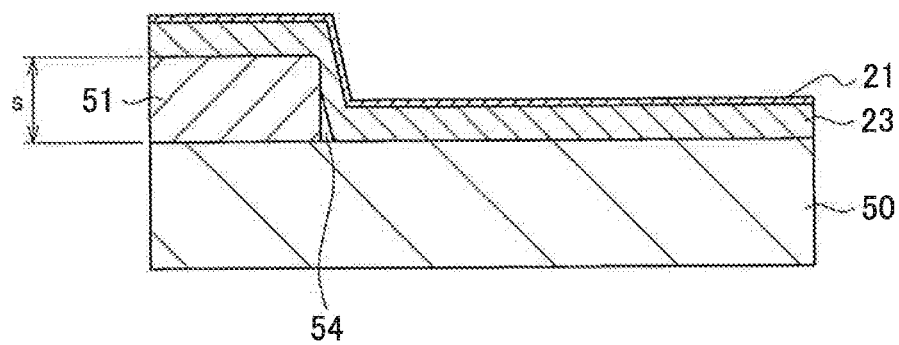
FIG. 9A is a cross-sectional view of a touch panel to which is applied an optical film according to the present embodiment.
Figure 9B:
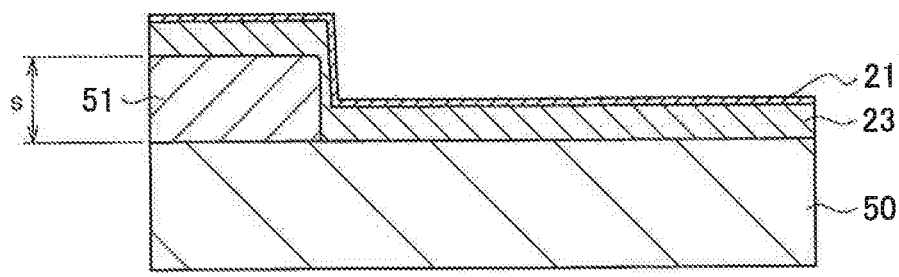
FIG. 9B is a cross-sectional view illustrating a state after performing an autoclaving process on the optical film illustrated in FIG. 9A.
Figure 10:
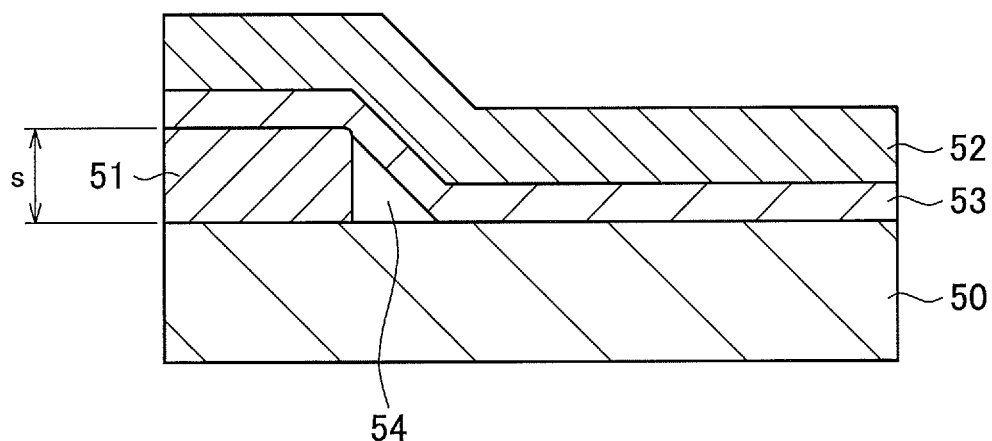
FIG. 10 is a cross-sectional view of a touch panel to which is applied an anti-reflective film of the related art.

Consequently, the film adhesive body with the optical film 21 applied thereto may be made thinner. Also, the optical film 21 is able to adequately conform to the surface shape of the adherend. For example, as illustrated in FIG. 9A, in the case of using the adhesive layer 23 with a thickness of 20 μm to apply the optical film 21 with a thickness of 5 μm to a touch panel 50 having a frame body 51 with a height s of 50 μm, the optical film 21 may be applied to the surface of the touch panel 50 and the frame body 51, while forming almost no air gap 54 at the perimeter of the frame body 51. Furthermore, after applying the optical film 21, an autoclaving process or the like may also be performed. In this case, as illustrated in FIG. 9B, the air gap 54 may be reduced even further. Consequently, the optical film 21 may be applied favorably to adherends having a variety of surface shapes.

<5. Configuration of Master>

Figure 3A:
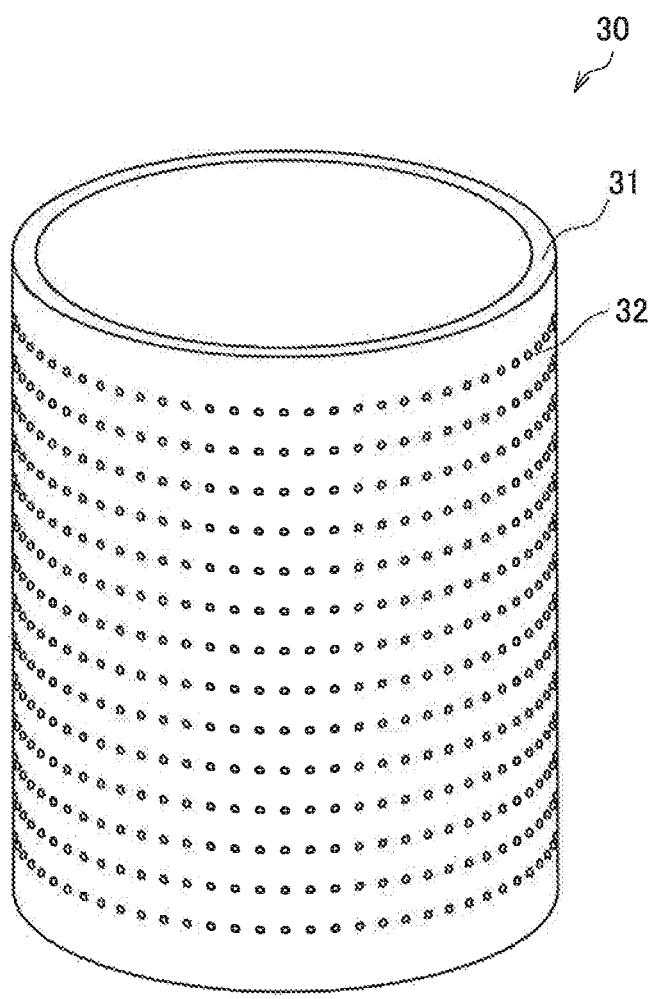
FIG. 3A is a perspective view illustrating an example appearance of a master on the circumferential face of which is formed a micro concave-convex structure.

The micro concave-convex structure 15 is produced using the master 30 illustrated in FIG. 3A, for example. Accordingly, the configuration of the master 30 will be described next. The master 30 is a master used in a nanoimprint method, and has a hollow round cylindrical shape, for example. The master 30 may also have a round columnar shape, or another shape (for example, a planar shape). However, if the master 30 has a round columnar or hollow round cylindrical shape, a micro concave-convex structure 32 of the master 30 may be transferred seamlessly to a resin base material or the like with a roll-to-roll method. Consequently, the master film 10 with the micro concave-convex structure 32 of the master 30 transferred thereonto may be produced with high production efficiency. From such a perspective, the shape of the master 30 is preferably a hollow round cylindrical shape or a round columnar shape.

The master 30 is provided with a master base material 31, and a micro concave-convex structure 32 (third micro concave-convex structure) formed on the surface of the master base material 31. The master base material 31 is a glass body, for example, and specifically is formed from quartz glass. However, the master base material 31 is not particularly limited insofar as the $SiO_2$ purity is high, and may also be formed from a material such as fused quartz glass or synthetic quartz glass. The shape of the master base material 31 is a hollow round cylindrical shape, but may also be a round columnar shape, or some other shape. However, as discussed above, the master base material 31 preferably has a hollow round cylindrical shape or a round columnar shape. The micro concave-convex structure 32 has the reverse shape of the micro concave-convex structure 15.

<6. Method of Manufacturing Master>

Next, a method of manufacturing the master will be described. First, a base material resist layer is formed (deposited) on the master base material 31. At this point, the resist constituting the base material resist layer is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer preferably is formed with a thermo-reactive resist including a metallic oxide.

In the case of using an organic resist, the base material resist layer may be formed on the master base material 31 by using a process such as spin coating, slit coating, dip coating, spray coating, or screen printing. Also, in the case of using an inorganic resist for the base material resist layer, the base material resist layer may be formed by sputtering.

Next, by exposing part of the base material resist layer with an exposure device 200 (see FIG. 3H), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the micro concave-convex structure 32 may be formed in the base material resist layer. The latent image is formed in the base material resist layer at an average cycle less than or equal to the visible light wavelengths.

Next, by dripping a developing solution onto the base material resist layer in which is formed the latent image, the base material resist layer is developed. As a result, a micro concave-convex structure is formed in the base material resist layer. Subsequently, by etching the master base material 31 and the base material resist layer using the base material resist layer as a mask, the micro concave-convex structure 32 is formed on the master base material 31. Note that although the etching method is not particularly limited, dry etching that is vertically anisotropic is preferable. For example, reactive ion etching (RIE) is preferable. By the above steps, the master 30 is produced. Note that anodic porous alumina obtained by the anodic oxidation of aluminum may also be used as the master. Anodic porous alumina is disclosed in WO 2006/059686, for example.

<7. Configuration of Exposure Device>

Next, the configuration of the exposure device 200 will be described based on FIG. 3H. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 31 is placed on the turntable 227 and able to be rotated.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the micro concave-convex structure 32, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component.

The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 200A based on the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also able to vary the radiation position of the laser light 200A guided onto the movable optical table 220. After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 31. In addition, the movable optical table 220 moves by one feed pitch (track pitch) in the direction of the arrow R (feed pitch direction) every time the master base material 31 undergoes one rotation. The master base material 31 is placed on the turntable 227. The spindle motor 225 causes the turntable 227 to rotate, thereby causing the master base material 31 to rotate.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 based on the modulation signal generated by the formatter 231. As a result, the irradiation of the master base material 31 by the laser light 200A is controlled.

The formatter 231 generates a control signal for irradiating the base material resist layer with the laser light 200A, based on an input image depicting an arbitrary pattern to draw on the base material resist layer. Specifically, first, the formatter 231 acquires an input image depicting an arbitrary pattern to draw on the base material resist layer. The input image is an image corresponding to a development of the outer circumferential surface of the base material resist layer, in which the outer circumferential surface of the base material resist layer is cut in the axial direction and expanded in a single plane. Next, the formatter 231 partitions the input image into sub-regions of a certain size (for example, partitions the input image into a lattice), and determines whether or not the draw pattern is included in each of the sub-regions. Subsequently, the formatter 231 generates a control signal to perform control to irradiate with the laser light 200A each sub-region determined to include the draw pattern. Furthermore, the driver 233 controls the output of the laser light source 201 based on the control signal generated by the formatter 231. As a result, the irradiation of the base material resist layer by the laser light 200A is controlled.

<8. Method of Manufacturing Master Film and Optical Film>

Next, a method of manufacturing the master film 10 and the optical film 21 will be described.

(Step 1)

Figure 3B:
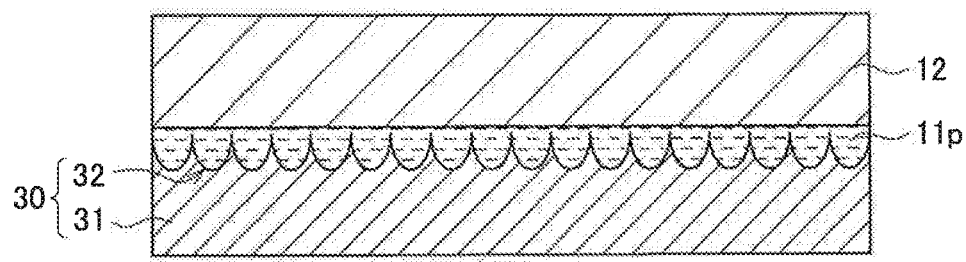
FIG. 3B is a cross-sectional view for explaining an optical body manufacturing process.

In Step 1, as illustrated in FIG. 3B, an uncured resin layer 11p (uncured resin layer for the master film) is formed on the base material film 12. At this point, the uncured resin layer 11p is made of an uncured curing resin or the like. Herein, the curing resin is as discussed earlier. The release agent or the like discussed earlier may also be added to the uncured resin layer 11p. Next, the uncured resin layer 11p is put in close contact with the micro concave-convex structure 32 of the master 30. As a result, the micro concave-convex structure 32 is transferred to the uncured resin layer 11p.

(Step 2)

Figure 3C:
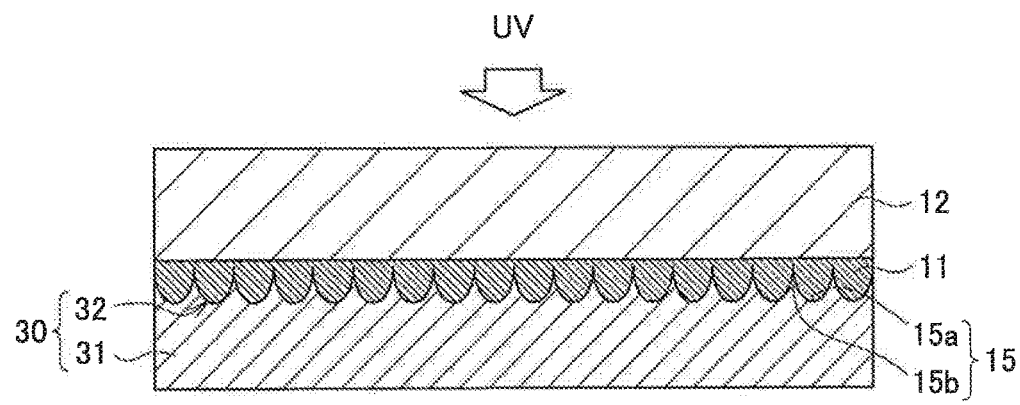
FIG. 3C is another cross-sectional view for explaining an optical body manufacturing process.
Figure 3D:
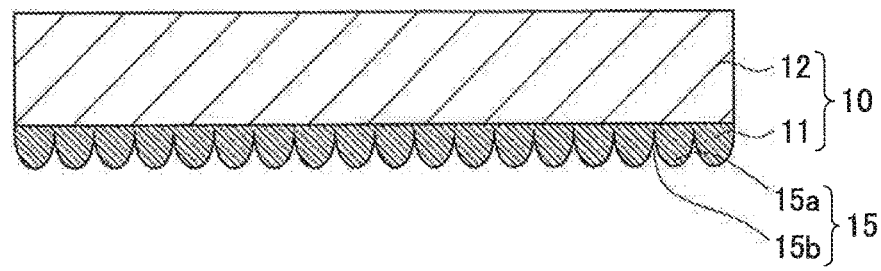
FIG. 3D is another cross-sectional view for explaining an optical body manufacturing process.

In Step 2, as illustrated in FIG. 3C, the uncured resin layer 11p is cured. As a result, the micro convex-concave resin layer 11 is formed on the base material film 12. In other words, the master film 10 is produced. In the example of FIG. 3C, the uncured resin layer 11p is cured by irradiating the uncured resin layer 11p with ultraviolet rays (UV light). Consequently, in this example, the uncured resin layer 11p is made of an ultraviolet-curing resin or the like. Next, as illustrated in FIG. 3D, the master film 10 is separated from the master 30. On the surface of the micro concave-convex structure 15, an inorganic film 16 as illustrated in FIG. 3J may be formed.

Note that Step 2 may also be conducted continuously by what is called a roll-to-roll transfer device. Hereinafter, a detailed configuration of a transfer device 300 will be described based on FIG. 3I. The transfer device 300 illustrated in FIG. 3I is a roll-to-roll transfer device using the master 30. The master film 10 may be produced by using such a transfer device 300. Note that in the transfer device 300, the master film 10 is produced using a light-curing resin. Obviously, the master film 10 may also be produced using another type of curing resin.

The transfer device 300 is provided with the master 30, a base material supply roll 301, a take-up roll 302, guide rolls 303 and 304, a nip roll 305, a separation roll 306, an applicator device 307, and an energy source 309.

The base material supply roll 301 is an elongated roll around which the base material film 12 is wound in a roll, while the take-up roll 302 is a roll that takes up the master film 10. Also, the guide rolls 303 and 304 are rolls that transport the base material film 12. The nip roll 305 is a roll that puts the base material film 12 laminated with uncured resin layer 11p, or in other words a transfer film 100, in close contact with the master 30. The separation roll 306 is a roll that separates the base material film 12 on which is formed the micro convex-concave resin layer 11, or in other words the master film 10, from the master 30.

The applicator device 307 is provided with an applicating means such as a coater, and applies an uncured light-curing resin to the base material film 12, and forms the uncured resin layer 11p. The applicator device 307 may be a device such as a gravure coater, a wire bar coater, or a die coater, for example. Also, the energy source 309 is a light source that emits light of a wavelength able to cure the light-curing resin, and may be a device such as an ultraviolet lamp, for example.

In the transfer device 300, first, the base material film 12 is sent continuously from the base material supply roll 301 via the guide roll 303. Note that partway through the delivery, the base material supply roll 301 may also be changed to a base material supply roll 301 of a separate lot.

The uncured light-curing resin is applied by the applicator device 307 to the delivered base material film 12, and the uncured resin layer 11p is laminated onto the base material film 12. As a result, the transfer film 100 is produced. The transfer film 100 is put into close contact with the master 30 by the nip roll 305. As a result, the micro concave-convex structure 32 of the master 30 is transferred to the uncured resin layer 11p. The energy source 309 is provided on the outside of the master 30. Subsequently, the energy source 309 irradiates with light the uncured resin layer 11p put in close contact with the master 30, thereby curing the uncured resin layer 11p. As a result, the micro convex-concave resin layer 11 is formed on the base material film 12. Next, the base material film 12 on which is formed the micro convex-concave resin layer 11, or in other words the master film 10, is separated from the master 30 by the separation roll 306. Next, the master film 10 is taken up by the take-up roll 302 via the guide roll 304.

In this way, in the transfer device 300, the circumferential shape of the master 30 is transferred to the transfer film 100 while transporting the transfer film 100 roll-to-roll. As a result, the master film 10 is produced.

Note that in the case of preparing the master film 10 with a thermosetting resin, the applicator device 307 and the energy source 309 become unnecessary. Also, the base material film 12 is taken to be a thermoplastic resin film, and a heater device is disposed farther upstream than the master 30. The base material film 12 is heated and softened by the heater device, and after that, the base material film 12 is pressed against the master 30. As a result, the micro concave-convex structure 32 formed on the circumferential face of the master 30 is transferred to the base material film 12. In this case, the base material film 12 and the micro convex-concave resin layer 11 become a solid cast. Note that the base material film 12 may also be taken to be a film made up of a resin other than a thermoplastic resin, in which the base material film 12 and a thermoplastic resin film are laminated. In this case, the laminated film is pressed against the master 30 after being heated by the heater device.

Consequently, the transfer device 300 is able to continuously produce a transfer product to which has been transferred the micro concave-convex structure 32 of the master 30, in other words, the master film 10. Herein, the micro concave-convex structure 32 formed on the circumferential face of the master 30 has the desired average cycle. Consequently, the micro concave-convex structure 15 formed on the master film 10 has the desired average cycle.

(Step 3)

Figure 3E:
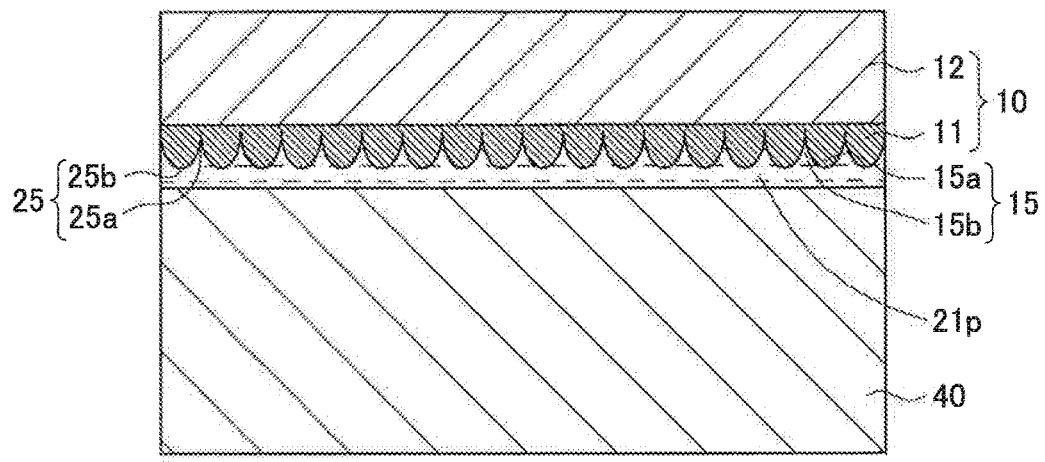
FIG. 3E is another cross-sectional view for explaining an optical body manufacturing process.

In Step 3, as illustrated in FIG. 3E, an uncured resin layer 21p (uncured resin layer for the optical film) is formed on the micro concave-convex structure 15. As a result, the micro concave-convex structure 15 is transferred to the uncured resin layer 21p.

At this point, it is sufficient for the uncured resin layer 21p to be made of a similar material as the uncured resin layer 11p. However, the specific material of the uncured resin layers 11p and 21p is selected so that the micro convex-concave resin layer 11 and the optical film 21 are separable. Additionally, the method of forming the uncured resin layer 21p on the micro concave-convex structure 15 is not particularly limited, and may be, for example, a method of dripping an uncured curing resin onto the micro concave-convex structure 15 with a dropper, or a method of using a die to fill an uncured curing resin between the master film 10 and a mirror master 40 made of glass whose surface has been given a mirror finish. In the example illustrated in FIG. 3E, the uncured resin layer 21p is formed on the micro concave-convex structure 15 using the mirror master 40. Herein, a master made of metal may also be used as the mirror master 40.

(Step 4)

Figure 3F:
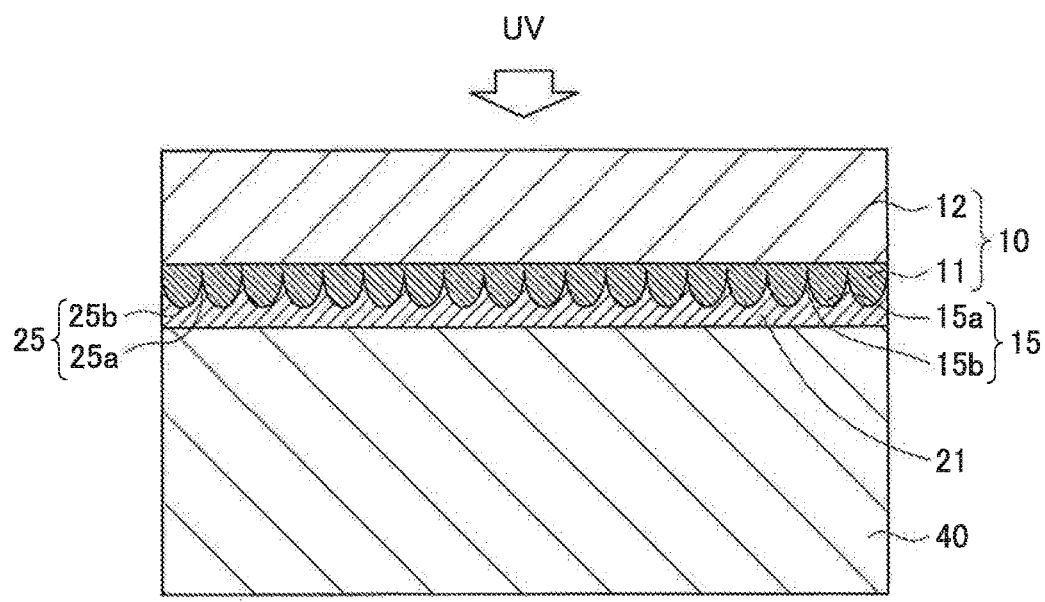
FIG. 3F is another cross-sectional view for explaining an optical body manufacturing process.
Figure 3G:
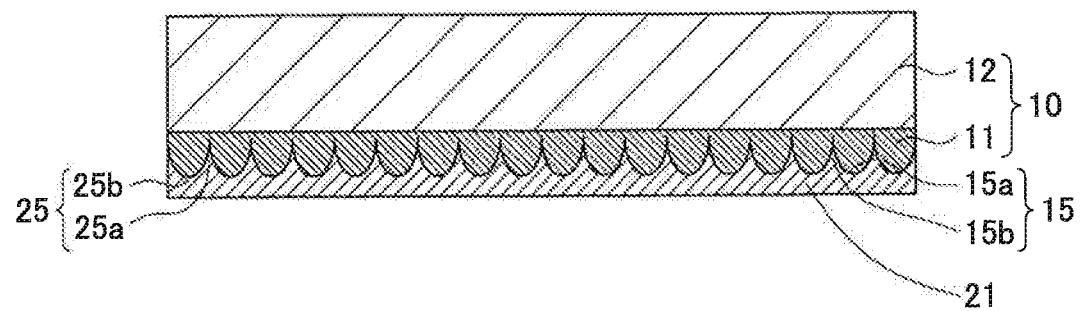
FIG. 3G is another cross-sectional view for explaining an optical body manufacturing process.
Figure 31:
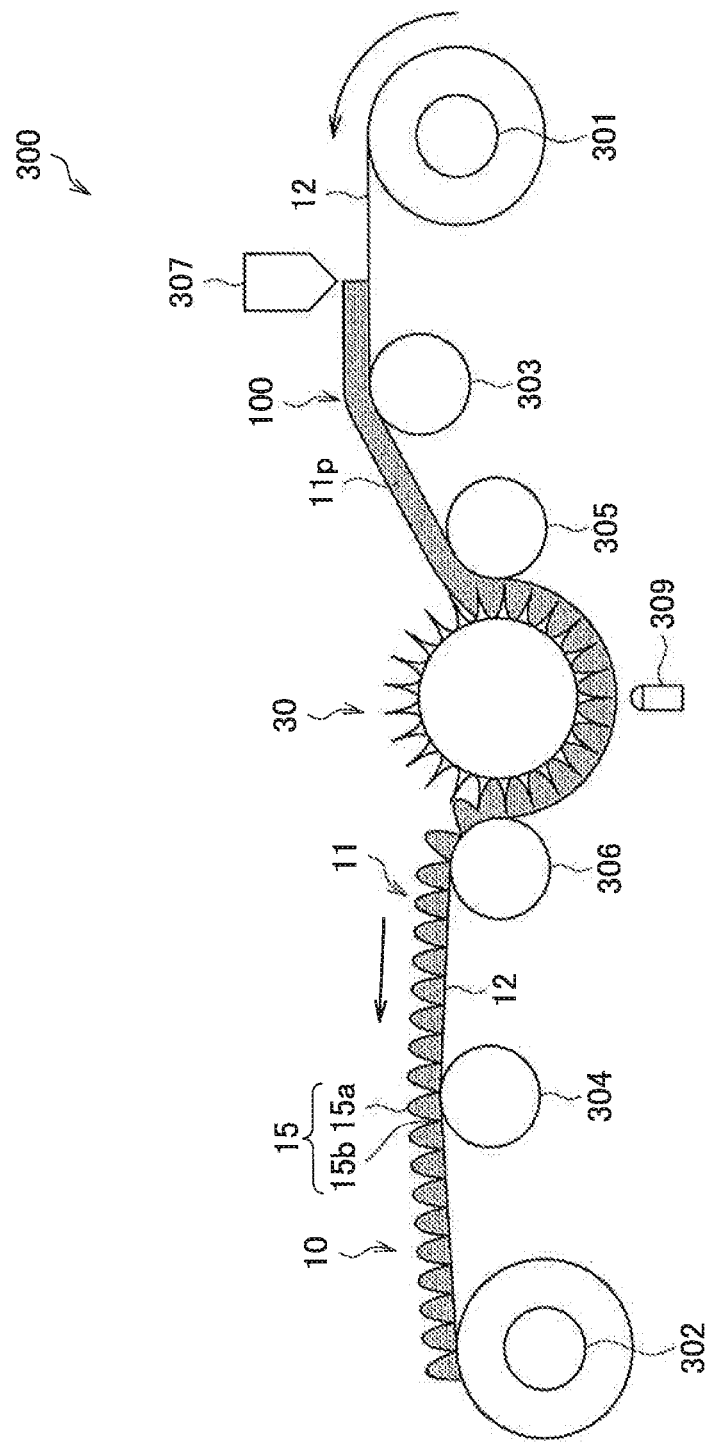
Figure 3J:
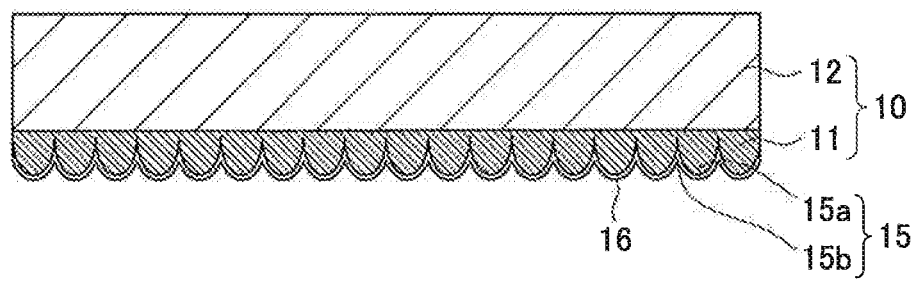
FIG. 3J is another cross-sectional view for explaining an optical body manufacturing process.

Next, as illustrated in FIG. 3F, the uncured resin layer 21p is cured. As a result, the optical film 21 is formed on the master film 10. In the example of FIG. 3F, the uncured resin layer 21p is cured by irradiating the uncured resin layer 21p with ultraviolet rays. Consequently, in this example, the uncured resin layer 21p is made of an ultraviolet-curing resin or the like. Next, as illustrated in FIG. 3G, the master film 10 and the optical film 21 are separated from the mirror master 40.

Note that whereas the interface between the optical film 21 and the mirror master 40 is flat, the micro concave-convex structures 15 and 25 are formed at the interface between the optical film 21 and the micro convex-concave resin layer 11 of the master film 10. Consequently, the surface area of the interface between the optical film 21 and the micro convex-concave resin layer 11 of the master film 10 becomes broad, and also works as an anchoring effect. For this reason, the optical film 21 is more firmly in contact with the micro convex-concave resin layer 11 of the master film 10 than the mirror master 40. For this reason, the optical film 21 may be separated easily from the mirror master 40.

(Step 5)

Next, as illustrated in FIG. 1, the adhesive layer 23 is formed on the other surface of the optical film 21 (the surface on the side on which the micro concave-convex structure 25 is not formed). For example, an adhesive tape is applied to the other surface of the optical film 21. As a result, the optical body 1 is produced.

<9. Optical Body Usage Method>

(First Usage Method)

Next, a first usage method of the optical body 1 will be described based on FIGS. 4A and 4B. In this usage method, the adhesive layer 23 is applied to the optical body 1. As illustrated in FIG. 4A, first, the adhesive layer 23 of the optical body 1 is applied to the surface of an adherend 41. The master film 10 is able to protect the micro concave-convex structure 25 of the optical film 21. For example, the master film 10 is able to prevent contact, friction, and the like between the micro concave-convex structure 25 and another object. Next, as illustrated in FIG. 4B, only the master film 10 is peeled away from the optical body 1. At this point, since the master film 10 is formed from a cured curing resin, residual debris or the like from the master film 10 is unlikely to remain on the micro concave-convex structure 25 of the optical film 21. Furthermore, since the optical film 21 may be made thinner, after the master film 10 is peeled away from the optical body 1, the optical film 21 is able to conform to surface concavities and convexities easily. Also, the master film 10 is usable as an anti-reflective film or the like. Note that the type of the adherend 41 is not particularly limited. For example, the adherend 41 may be any of various types of optical devices (optical components), display elements, and input elements. The adherend 41 may be an object such as a camera, a display, a projector, a telescope, a touch panel, a wearable terminal, a head-mounted display, an in-vehicle display, or a show window, for example. Particularly, the optical film 21 is able to conform to the surface shape of the adherend 41 even if the surface shape of the adherend 41 is distorted (having concavities and convexities or having a curved face, for example). The optical body 1 may be used as an anti-reflective film for these optical devices. Obviously, the optical body 1 may also be applied to another adherend 41.

(Second Usage Method)

Next, a second usage method of the optical body 1 will be described based on FIGS. 5A to 5C. In this usage method, the adhesive layer 23 is not applied to the optical body 1. As illustrated in FIG. 5A, first, an uncured adhesive layer 23*b* is formed on the surface of the adherend 41. The type of adhesive agent constituting the adhesive layer 23*b* does not particularly matter, and may be similar to the adhesive agent constituting the adhesive layer 23, for example. Next, as illustrated in FIG. 5B, the optical body 1 is applied to the adhesive layer 23*b*. Next, by curing the adhesive layer 23*b*, the adhesive layer 23*b* becomes a cured layer 23B. For example, the adhesive layer 23*b* may be cured by irradiating the adhesive layer 23*b* with ultraviolet rays. In this case, the adhesive layer 23*b* is made of a light-curing resin. Next, as illustrated in FIG. 5C, only the master film 10 is peeled away from the optical body 1.

As above, according to the present embodiment, the optical film 21 is protected by the master film 10, and thus a protective film becomes unnecessary. Furthermore, the master film 10 is made up of a cured curing resin. For this reason, when the master film 10 is peeled away from the optical film 21, residual debris or the like from the master film 10 is unlikely to remain on the micro concave-convex structure 25 of the optical film 21. Furthermore, since the optical body 1 is able to gain thickness due to the master film 10, the handling properties of the optical body 1 may be improved while also making the optical film 21 thinner.

EXAMPLES

Hereinafter, the present invention will be described more specifically using Examples.

Example 1

In Example 1, the optical body 1 was produced according to the following steps. As the base material film 12, a PET film with a thickness of 50 μm was prepared. Additionally, as the light-curing resin, an ultraviolet-curing acrylic resin (Dexerials Corp., SK1100 series) to which a silicone-based release agent (BYK, silicone lubricant BYK-333) was added was prepared. Subsequently, by coating the base material film 12 with the light-curing resin, the uncured resin layer 11*p* was formed on the base material film 12. Meanwhile, the master 30 was produced using the exposure device 200 discussed earlier. Next, by pressing the uncured resin layer 11*p* against the circumferential surface of the master 30, the micro concave-convex structure 32 formed on the circumferential surface of the master 30 was transferred to the uncured resin layer 11*p*. Next, by curing the uncured resin layer 11*p*, the micro convex-concave resin layer 11 was produced. In other words, the master film 10 was produced.

At this point, the thickness of the micro convex-concave resin layer 11 was taken to be approximately 3 μm. Also, the convexities 15*a* and the concavities 15*b* of the micro concave-convex structure 15 were arranged in a staggered lattice. Also, the height L1 of the convexities 15*a* was taken to be from 200 nm 250 nm, the dot pitch L2 was taken to be from 230 nm to 270 nm, and the track pitch L3 was taken to be from 150 nm to 180 nm. The surface shape of the micro concave-convex structure 15 was confirmed with a scanning electronic microscope (SEM).

Meanwhile, as the light-curing resin used for the optical film 21, an ultraviolet-curing resin was prepared in which a modified diacrylate with few functional groups (Toagosei Co., M260) was added to a multifunctional special acrylate (Dexerials Corp., SK1100 series). In other words, in Example 1, a modified diacrylate with few functional groups was added to an ultraviolet-curing resin to make the elastic modulus of the optical film 21 lower than the elastic modulus of the micro convex-concave resin layer 11.

Additionally, by coating the micro concave-convex structure 15 of the master film 10 with a light-curing resin, the uncured resin layer 21*p* was formed on the micro concave-convex structure 15. By this step, the micro concave-convex structure 15 was transferred to the uncured resin layer 21*p*. Next, by curing the uncured resin layer 21*p*, the optical film 21 was produced. At this point, the thickness of the optical film 21 was taken to be approximately 3 μm. Also, the elastic modulus of the master film 10 (specifically, the elastic modulus of the micro convex-concave resin layer 11) and the elastic modulus of the optical film 21 were measured by a viscoelasticity measuring apparatus (DMA) (Texas Instruments Rheometrics System Analyzer-3 (RSA-3)). The result was that the elastic modulus of the master film 10 was 2710 MPa, while the elastic modulus of the optical film 21 was 1300 MPa. Next, as the adhesive layer 23, an optically clear adhesive tape (OCA tape) with a thickness of 25 μm (acrylic adhesive material, product name: FW25, Nichiei Co.) was applied to the optical film 21. By the above steps, the optical body 1 was produced.

Example 2

Besides the height L1 of the convexities 15*a* being from 150 nm to 200 nm, and the dot pitch L2 and the track pitch L3 both being from 150 nm to 270 nm, steps similar to Example 1 were performed. As a result, the optical body 1 according to Example 2 was produced.

Example 3

Besides the height L1 of the convexities 15*a* being from 200 nm to 250 nm, and the dot pitch L2 and the track pitch L3 both being from 150 nm to 270 nm, steps similar to Example 1 were performed. As a result, the optical body 1 according to Example 3 was produced.

Example 4

In Example 4, the optical body 1 was prepared according to the following steps. As the base material film 12, a PET film with a thickness of 50 μm was prepared. Additionally, as the photocurable resin, an ultraviolet-curing acrylic resin (Dexerials Corp., SK1100 series) to which a silicone-based release agent (BYK, silicone lubricant BYK-333) was added was prepared. Subsequently, by coating the base material film 12 with the photocurable resin, the uncured resin layer 11*p* was formed on the base material film 12. Meanwhile, the master 30 was produced using the exposure device 200 discussed earlier. Next, by pressing the uncured resin layer 11*p* against the circumferential surface of the master 30, the micro concave-convex structure 32 formed on the circumferential surface of the master 30 was transferred to the uncured resin layer 11*p*. Next, by curing the uncured resin layer 11*p*, the micro convex-concave resin layer 11 was produced. In other words, the master film 10 was produced.

At this point, the thickness of the micro convex-concave resin layer 11 was taken to be approximately 3 μm. Also, the convexities 15*a* and the concavities 15*b* of the micro concave-convex structure 15 were arranged in a staggered lattice. Also, the height L of the convexities 15*a* was taken to be 250 nm, the dot pitch L2 was taken to be from 153 nm to 230 nm, and the track pitch L3 was taken to be from 153 nm to 230 nm. The surface shape of the micro concave-convex structure 15 was confirmed with a scanning electronic microscope (SEM).

Next, by sputtering silicon on the surface of the micro concave-convex structure 15, an inorganic film was formed on the micro concave-convex structure 15. The thickness of the inorganic film was taken to be 20 nm. After that, by conducting processes similar to Example 1, the optical film 21 was produced.

(Spectral Reflection Spectra)

The spectral reflection spectra (spectral specular reflection spectra) of the master film 10 and the optical film 21 produced by Examples 1 to 4 were measured.

Figure 6A:
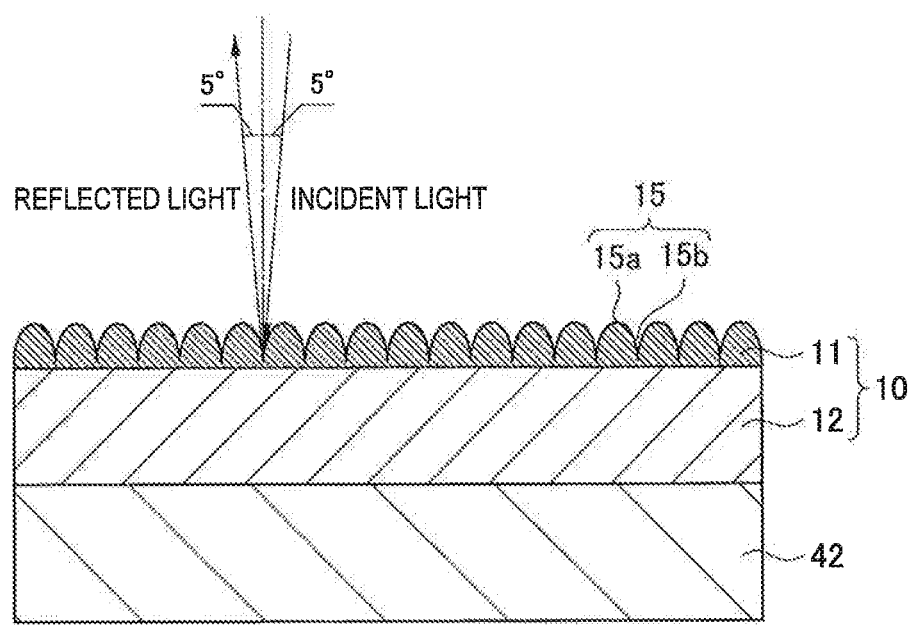
FIG. 6A is a cross-sectional view for explaining a method of measuring a spectral reflectance of a master film.

The spectral reflection spectrum of the master film 10 was measured according to the following steps. Namely, as illustrated in FIG. 6A, a black polyethylene terephthalate (PET) plate 42 was applied by OCA tape to the other surface of the master film 10 (the surface on the side on which the micro concave-convex structure 11 was not formed). In other words, reflections from the other surface of the master film 10 could be cancelled. Subsequently, the spectral specular reflection spectrum at the micro concave-convex structure 15 was measured. The spectral specular reflection spectrum was measured using a spectrophotometer (model number V-550 with absolute reflectance measuring unit attached, JASCO Corporation). Also, the angle of incidence and the angle of reflection were both taken to be 5°, the wavelength range was taken to be from 350 nm to 800 nm, and the wavelength resolution was taken to be 1 nm. Also, regarding Example 4, the spectral reflection spectrum was measured using the master film 10 before the inorganic film was formed.

Figure 6B:
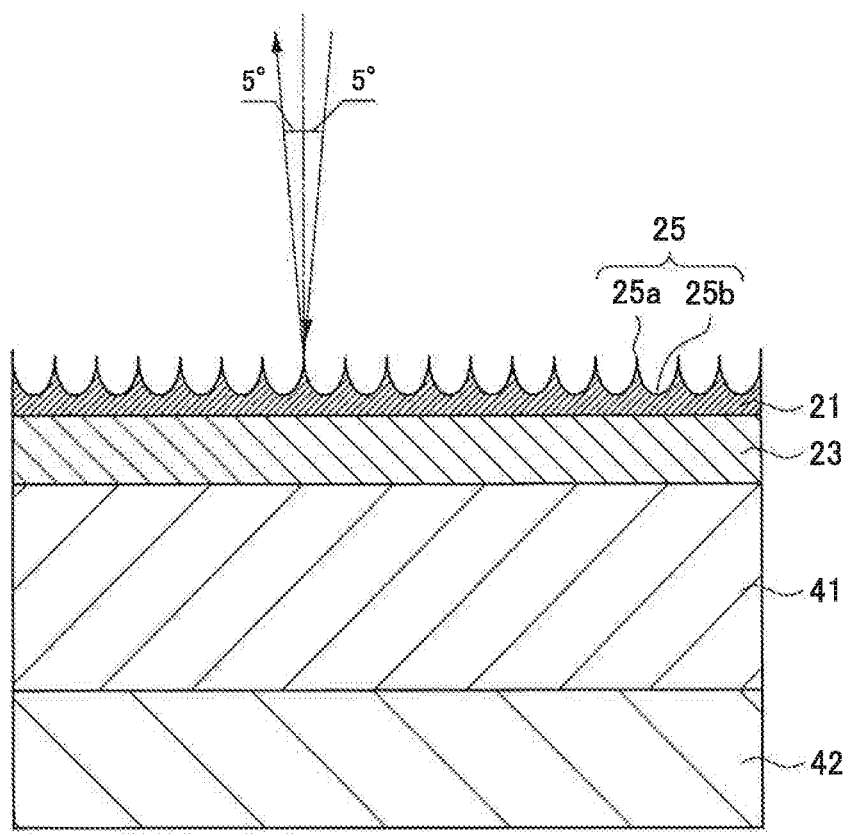
FIG. 6B is a cross-sectional view for a method of measuring the spectral reflectance of an optical film.

The spectral reflection spectrum of the optical film 21 was measured according to the following steps. Namely, as illustrated in FIG. 6B, the optical film 21 was applied to a glass adherend 41 by the adhesive layer 23. Furthermore, on the other surface of the adherend 41 (the surface on the side on which the optical film 21 was not applied), the black PET plate 42 was applied by OCA tape. Consequently, reflections from the other surface of the adherend 41 could be cancelled. Subsequently, the spectral specular reflection spectrum at the micro concave-convex structure 25 was measured. The specific measuring method was taken to be similar to that of the master film 10.

Figure 7A:
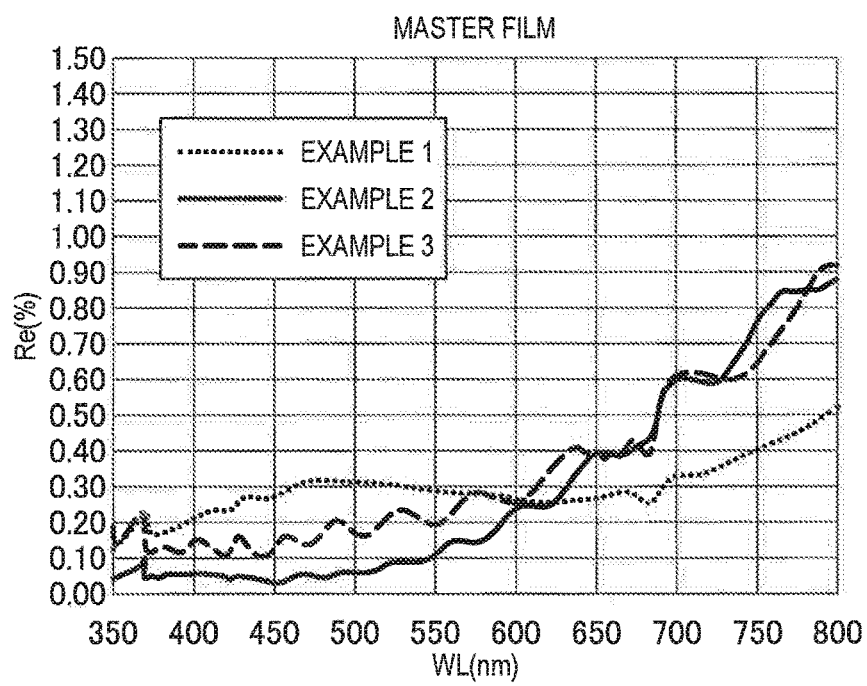
FIG. 7A is spectral reflection spectra of master films of Examples 1 to 3.
Figure 7B:
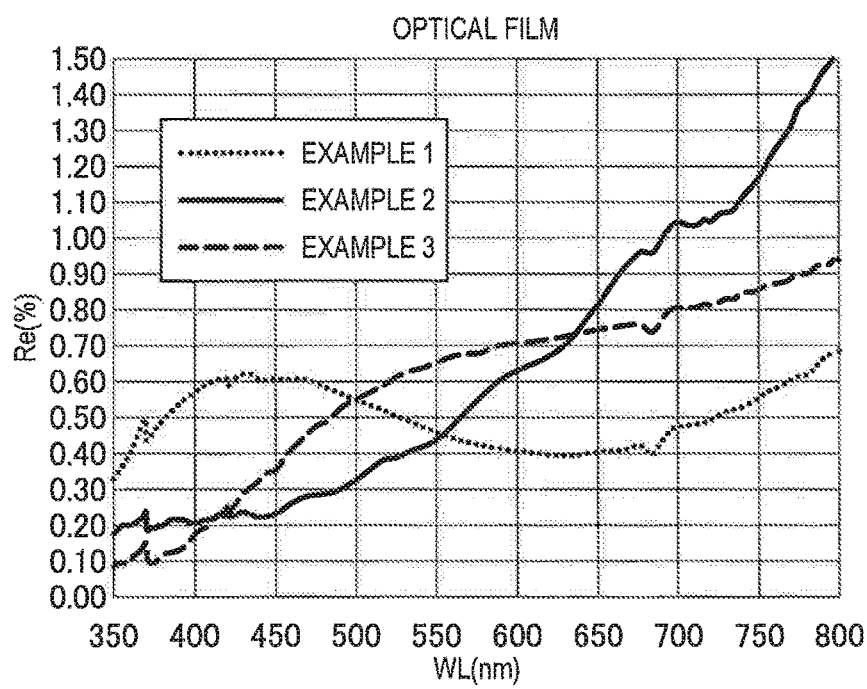
FIG. 7B is spectral reflection spectra of optical films of Examples 1 to 3.
Figure 7C:
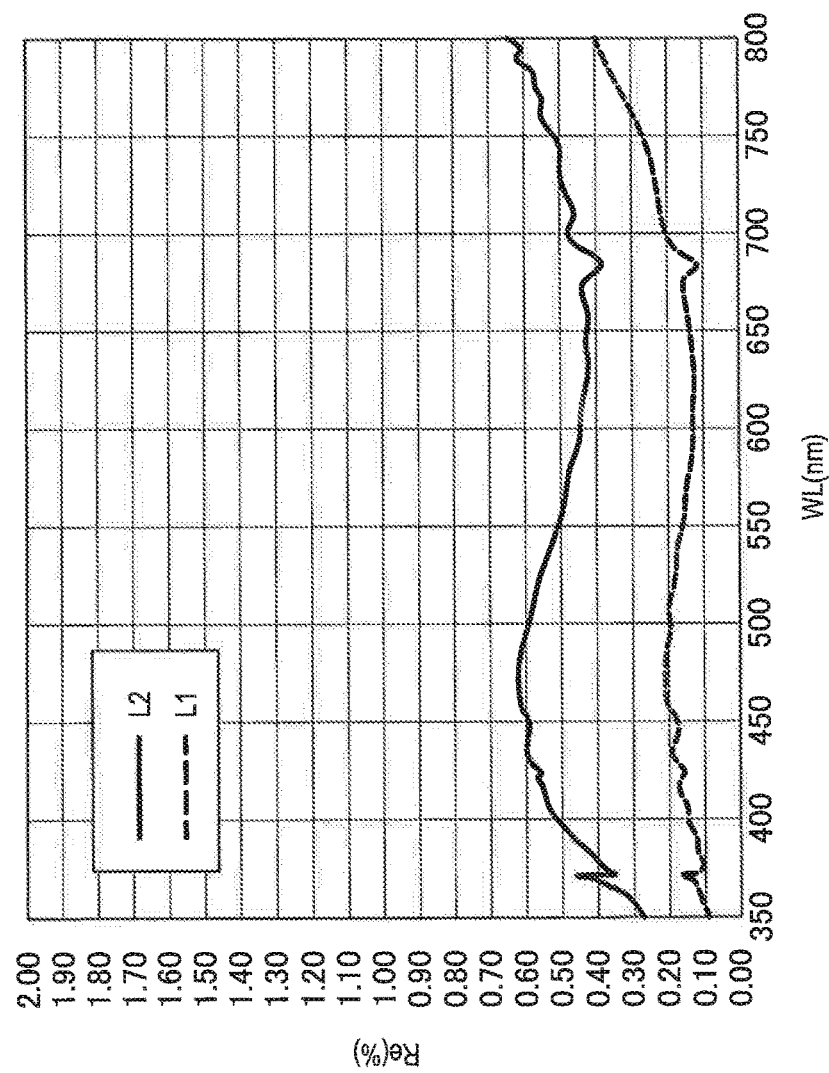
FIG. 7C is a spectral reflection spectrum of a master film of Example 4 and a spectral reflection spectrum of an optical film of Example 4.

The spectral reflection spectra measurement results are illustrated in FIGS. 7A, 7B, and 7C. In FIGS. 7A to 7C, the horizontal axis represents the wavelength, while the vertical axis represents the spectral reflectance (specular reflectance). In FIG. 7C, the curve L1 represents the spectral reflection spectrum of the master film 10, while the curve L2 represents the specular reflection spectrum of the optical film 21. Also, regarding Examples 3 and 4, a color tone (in the Yxy color space, the numerical values of Y, x, and y; in the L*a*b* color space, the numerical values of a* and b*) is computed from the spectral reflection spectrum. Table 1 shows the computational results regarding Example 3, while Table 2 shows the computational results regarding Example 4.

TABLE 1

| | Color tone | | | | |
|---|---|---|---|---|---|
| | Y | x | y | a* | b* |
| Optical film 21 | 0.46 | 0.279 | 0.298 | −0.26 | −2.17 |
| Master film 10 | 0.33 | 0.287 | 0.317 | −0.62 | −0.75 |

TABLE 2

| | Color tone | | | | |
|---|---|---|---|---|---|
| | Y | x | y | a* | b* |
| Optical film 21 | 0.46 | 0.279 | 0.298 | −0.26 | −2.17 |
| Master film 10 | 0.33 | 0.287 | 0.317 | −0.62 | −0.75 |

As illustrated in FIGS. 7A, 7B, and 7C, the spectral reflectance (specular reflectance) of Examples 1 to 4 was from 0.1% to 1.8% within the range of measurement wavelengths from 350 nm to 800 nm, thereby demonstrating that both the master film 10 and the optical film 21 according to Examples 1 to 4 were usable as an anti-reflective film. Also, regarding the color tone, results on a level that did not pose a problem for an anti-reflective film were obtained.

(Application Test)

A frame body with a height of 50 μm was attached to the surface of a glass substrate to thereby produce the adherend 41. Subsequently, the optical body 1 produced in Example 1 was attached to the adherend 41, and after that, the master film 10 was peeled away. Also, a similar adherend 41 was produced, and the master film 10 was attached to the adherend 41 by OCA tape. In other words, a film adhesive body to which was applied the optical film 21, and a film adhesive body to which was applied the master film 10, were produced. Subsequently, these film adhesive bodies were observed visually. As a result, in the film adhesive body to which was applied the optical film 21, almost no air gap 54 was observed at the perimeter of the frame body. However, in the film adhesive body to which was applied the master film 10, a large air gap 54 was observed in numerous places at the perimeter of the frame body.

Furthermore, an autoclaving process (conditions: 50° C. and +0.5 atm, maintained for 0.5 h) was conducted on each film adhesive body. Subsequently, the film adhesive bodies after the autoclaving process were observed visually. As a result, in the film adhesive body to which was applied the optical film 21, it was confirmed that the air gap 54 had disappeared. On the other hand, in the film adhesive body to which was applied the master film 10, there was no change in the distribution of the air gap 54. In other words, a large air gap 54 was still observed in numerous places.

An optical body according to a comparative example was produced in accordance with the method disclosed in Patent Literature 3. This optical body is provided with an optical film and a protective film. The optical film is provided with a base material film with a thickness of 50 μm, a micro convex-concave resin layer with a thickness of 3 μm formed on one surface of the base material film, and an adhesive layer with a thickness of 25 μm formed on the other surface of the base material film. The protective film protects the micro convex-concave resin layer. The thickness of the protective film was taken to be 38 μm. Subsequently, the optical body was applied to an adherend 41 similar to the above, and the protective film was peeled away. Subsequently, the above test was performed on the film adhesive body to which was applied the optical film. As a result, a large air gap 54 was observed in numerous places, regardless of whether or not the autoclaving process was performed. Also, on the surface of the micro convex-concave resin layer, adhesive agent (residue from the protective film) was observed sporadically.

In this way, whereas almost no air gap 54 was observed in the film adhesive body to which was applied the optical film 21 according to Example 1, a large air gap 54 was observed in numerous places in the film adhesive body to which was applied the master film 10 or the optical film according to the comparative example. Since the optical film 21 is thin compared to the master film 10 and the optical film according to the comparative example, the optical film 21 is inferred to have excellent conformability to the shape of the surface of the adherend 41.

Example 5

The optical body 1 was produced according to steps similar to Example 1. However, in Example 5, the adhesive layer 23 was not formed on the optical film 21.

Next, a silicon adhesive agent that acted as a light-curing adhesive agent (Shin-Etsu Chemical Co., KER2500) was used to coat a white plate glass (coat thickness from 0.005 mm to 0.01 mm). Next, the optical film 21 of the optical body 1 was applied to the silicone adhesive layer. Next, the silicone adhesive layer was cured. Next, the master film 10 was peeled away. As a result, a white plate glass with the optical film applied thereto was obtained.

In Example 5, the light-resistance of the white plate glass with the optical film applied thereto was examined. Specifically, light was radiated under the following conditions from the optical film 21 side of the white plate glass with the optical film applied thereto. Additionally, before and after the light radiation, the spectral transmittance of the white plate glass with the optical film applied thereto was measured with a V-560 spectrophotometer and an absolute reflectance measuring unit ARV-474S from JASCO Corporation.

Light Radiation Conditions
Light source: ultraviolet LED lamp (wavelength 385 nm)
Intensity: 1000 mW/cm$^2$
Distance between light source and white plate glass with optical film applied thereto: 2 cm
Radiation time: 2 hours Additionally, as an optical film according to a control (I), a cyclo-olefin polymer (COP) film (Zeon Corporation, ZF14) (thickness 100 μm) was prepared. Furthermore, the silicone adhesive agent used in Example 5 was used to coat the surface of a white plate glass with at a coat thickness of 0.01 mm and then light-cured, thereby preparing an optical film according to a control (II). Subsequently, the spectral transmittance of these optical films was measured similarly.

The results are illustrated in FIG. 8. In FIG. 8, the horizontal axis represents the wavelength, while the vertical axis represents the diffuse transmittance (spectral transmittance). According to FIG. 8, the optical body 1 does not undergo great variations in transmittance before and after being irradiated with ultraviolet rays, and maintains a high transmittance, thus demonstrating better light resistance than the COP film (control (I)) and the optical film with a cured silicone adhesive agent (control (II)), which are typically considered to have excellent optical properties.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

Reference Signs List

1 optical body
10 master film
11 micro convex-concave resin layer
12 base material film
15 micro concave-convex structure
15A convexity
15B concavity
21 optical film
23 adhesive layer
25 micro concave-convex structure
25A convexity
25B concavity

The invention claimed is:

1. An optical body, comprising:
an optical film, on one surface of which is formed a first micro concave-convex structure in which an average cycle of concavities and convexities is less than or equal to a visible light wavelength; and
a master film that covers the first micro concave-convex structure, wherein the optical film and the master film are separable from each other,
wherein the master film is provided with a second micro concave-convex structure formed on a surface that faces the first micro concave-convex structure,
wherein the second micro concave-convex structure has an elastic modulus of from 700 MPa to 1500 MPa, is made of a cured curing resin, and has a reverse shape of the first micro concave-convex structure, and
wherein an elastic modulus of the optical film is from 300 MPa to 700 MPa, and wherein the elastic modulus of the optical film provides for the separability between the optical film and the master film.

2. The optical body according to claim 1, wherein a thickness of the optical film is from 1 μm to 10 μm.

3. The optical body according to claim 1, further comprising:
an adhesive layer formed on another surface of the optical film.

4. The optical body according to claim 3, wherein a thickness of the adhesive layer is from 2 μm to 50 μm.

5. The optical body according to claim 3, wherein a total thickness of the optical film and the adhesive layer is from 3 μm to 60 μm.

6. The optical body according to claim 1, wherein the master film includes an inorganic film that covers the second micro concave-convex structure.

7. The optical body according to claim 1, wherein a spectral reflectance for wavelengths from 350 nm to 800 nm of the first micro concave-convex structure and the second micro concave-convex structure is from 0.1% to 1.8%.

8. The optical body according to claim 1,
wherein a release agent is added to at least one of the optical film and the master film.

9. A film adhesive body, comprising:
an adherend;
an adhesive layer; and
the optical film according to claim 1 applied to the adherend via the adhesive layer, wherein the optical film is applied to the adherend by applying the optical body according to claim 1 to the adherend via the adhesive layer, and then peeling away the master film from the optical body.

10. The film adhesive body according to claim 9, wherein the adherend is any one type selected from the group consisting of an optical component, a display element, and an input element.

11. A method for manufacturing the optical body according to claim 1, comprising:
preparing a master, on a surface of which is formed a third micro concave-convex structure in which an average cycle of concavities and convexities is less than or equal to a visible light wavelength;
transferring the third micro concave-convex structure to an uncured resin layer for the master film, and thus forming, on a surface of the uncured resin layer for the master film, the second micro concave-convex structure having a reverse shape of the third micro concave-convex structure;
producing the master film by curing the uncured resin layer for the master film;
transferring the second micro concave-convex structure formed on a surface of the master film to an uncured resin layer for the optical film, and thus forming, on a surface of the uncured resin layer for the optical film, the first micro concave-convex structure having a reverse shape of the second micro concave-convex structure; and
producing the optical film by curing the uncured resin layer for the optical film.

12. The method for manufacturing an optical body according to claim 11, wherein a thickness of the optical film is from 1 μm to 10 μm.

13. The method for manufacturing an optical body according to claim 11, further comprising:
forming an adhesive layer on a surface on an opposite side of the surface on which is formed the first micro concave-convex structure from among surfaces of the optical film.

14. The method for manufacturing an optical body according to claim 13, wherein a thickness of the adhesive layer is from 2 μm to 50 μm.

15. The method for manufacturing an optical body according to claim 11,
wherein after producing the master film, an inorganic film that covers the second micro concave-convex structure is formed, and
wherein the second micro concave-convex structure on which is formed the inorganic film is transferred to the uncured resin layer for the optical film.

16. The method for manufacturing an optical body according to claim 11,
wherein a release agent is added to at least one of the uncured resin layer for the master film and the uncured resin layer for the optical film.

17. The method for manufacturing an optical body according to claim 11,
wherein a difference between the elastic modulus of the optical film and the elastic modulus of the master film is between 400 and 1200 MPa.

18. The method for manufacturing an optical body according to claim 11,
wherein the optical film and the second micro concave-convex structure have a mutually different elastic modulus.

19. The optical body according to claim 1,
wherein a difference between the elastic modulus of the optical film and the elastic modulus of the master film is between 400 and 1200 MPa.

20. The optical body according to claim 1,
wherein the optical film and the second micro concave-convex structure have a mutually different elastic modulus.

21. The optical body according to claim 1, wherein the optical body does not comprise a release agent between the optical film and the master film.

22. The optical body according to claim 1, wherein the optical body does not comprise an inorganic film between the optical film and the master film.

* * * * *